US009182289B2

(12) United States Patent
Barrett et al.

(10) Patent No.: US 9,182,289 B2
(45) Date of Patent: Nov. 10, 2015

(54) APPARATUS AND METHOD FOR ESTIMATING WAVEFRONT PARAMETERS

(75) Inventors: Harrison Barrett, Tucson, AZ (US); Luca Caucci, Tucson, AZ (US); Lars Furenlid, Tucson, AZ (US); Akinori Ohkubo, Utsunomiya (JP)

(73) Assignees: Canon Kabushiki Kaisha, Tokyo (JP); The Arizona Board of Regents on Behalf of the University of Arizona, Tucson, AZ (US)

( * ) Notice: Subject to any disclaimer, the term of this patent is extended or adjusted under 35 U.S.C. 154(b) by 798 days.

(21) Appl. No.: 13/418,073

(22) Filed: Mar. 12, 2012

(65) Prior Publication Data

US 2013/0092816 A1 Apr. 18, 2013

Related U.S. Application Data

(60) Provisional application No. 61/547,583, filed on Oct. 14, 2011.

(51) Int. Cl.
*G01J 1/20* (2006.01)
*G01J 9/00* (2006.01)

(52) U.S. Cl.
CPC ........................................ *G01J 9/00* (2013.01)

(58) Field of Classification Search
CPC .. G01J 9/00; G01J 2009/002; G01J 2001/448
USPC ............... 250/208.2, 208.5, 201.1, 201.9; 356/121, 124, 125, 511, 512, 513, 514, 356/515; 702/81, 189; 351/205, 206
See application file for complete search history.

(56) References Cited

U.S. PATENT DOCUMENTS

| 4,309,602 | A | * | 1/1982 | Gonsalves et al. | 250/201.9 |
| 4,504,135 | A | * | 3/1985 | Kawabata | 396/110 |
| 4,659,917 | A | * | 4/1987 | Suzuki et al. | 250/201.8 |
| 5,072,104 | A | * | 12/1991 | Tatian | 250/201.9 |
| 5,233,174 | A | | 8/1993 | Zmek | |

(Continued)

FOREIGN PATENT DOCUMENTS

| JP | 09257643 A | 10/1997 |
| JP | 2002181663 A | 6/2002 |

(Continued)

OTHER PUBLICATIONS

Barrett et al., "Maximum-likelihood methods in wavefront sensing: stochastic models and likelihood functions," J. Opt. Soc. Am. A. 24, 391-414 (2007).

(Continued)

*Primary Examiner* — John Lee
(74) *Attorney, Agent, or Firm* — Canon USA Inc., IP Division

(57) ABSTRACT

An apparatus for estimating a wavefront parameter includes a light source, a lenslet array, a detector for detecting light generated by the light source and passed through the lenslet array, a wavefront corrective element disposed between the lenslet array and the light source; and a data analyzer configured to estimate at least one wavefront parameter at a plane located on the light source side of the corrective element. The lenslet array and the sensor array are arranged to form a wavefront sensor, and the wavefront corrective element is configured to correct an aberration of the wavefront.

3 Claims, 24 Drawing Sheets

(56) References Cited

U.S. PATENT DOCUMENTS

| | | | |
|---|---|---|---|
| 5,426,521 A * | 6/1995 | Chen et al. | 359/9 |
| 6,480,267 B2 * | 11/2002 | Yanagi et al. | 356/121 |
| 6,774,898 B1 * | 8/2004 | Katayama et al. | 345/428 |
| 8,201,943 B2 * | 6/2012 | Hammer et al. | 351/206 |
| 8,882,268 B2 * | 11/2014 | Calixte et al. | 351/159.77 |
| 2003/0151720 A1 * | 8/2003 | Chernyak et al. | 351/206 |
| 2003/0184762 A1 * | 10/2003 | Kim et al. | 356/512 |
| 2004/0041978 A1 * | 3/2004 | Neal et al. | 351/204 |
| 2004/0260275 A1 * | 12/2004 | Liang et al. | 606/5 |
| 2005/0099600 A1 * | 5/2005 | Frey et al. | 351/205 |
| 2007/0158529 A1 * | 7/2007 | Smith | 250/201.9 |
| 2007/0236701 A1 * | 10/2007 | Neal et al. | 356/512 |
| 2007/0247638 A1 * | 10/2007 | Owner-Petersen et al. | 356/511 |
| 2007/0247698 A1 * | 10/2007 | Yoon | 359/277 |
| 2009/0009717 A1 * | 1/2009 | Barrett et al. | 351/221 |
| 2009/0028198 A1 * | 1/2009 | Belenkii | 372/33 |
| 2009/0185132 A1 * | 7/2009 | Raymond et al. | 351/205 |
| 2009/0284753 A1 | 11/2009 | Neal et al. | |
| 2009/0296055 A1 * | 12/2009 | Ye et al. | 355/30 |
| 2010/0053411 A1 * | 3/2010 | Robinson et al. | 348/335 |
| 2010/0231858 A1 * | 9/2010 | Su et al. | 351/212 |
| 2011/0202286 A1 * | 8/2011 | De Rossi et al. | 702/19 |
| 2011/0276043 A1 * | 11/2011 | Youssefi et al. | 606/5 |
| 2012/0008181 A1 * | 1/2012 | Cable et al. | 359/9 |
| 2012/0016644 A1 * | 1/2012 | De Rossi et al. | 703/2 |
| 2012/0032065 A1 * | 2/2012 | Armstrong | 250/201.9 |
| 2012/0296591 A1 * | 11/2012 | Ohkubo et al. | 702/81 |
| 2013/0014065 A1 * | 1/2013 | Feng et al. | 716/51 |
| 2013/0092816 A1 * | 4/2013 | Barrett et al. | 250/201.9 |
| 2013/0107204 A1 * | 5/2013 | Spratt et al. | 351/159.74 |

FOREIGN PATENT DOCUMENTS

| | | |
|---|---|---|
| JP | 2002250622 A | 9/2002 |
| JP | 2004-253673 A | 9/2004 |
| JP | 2008135745 A | 6/2008 |
| JP | 2010286367 A | 12/2010 |
| WO | 03/075328 A1 | 9/2003 |

OTHER PUBLICATIONS

Krieg et al., "Inverse propagation algorithm for angstrom accuracy interferometer," in Interferometry XII: Techniques and Analysis, vol. 5531, Proceedings of the Society of Photo-Optical Instrumentation Engineers (SPIE), Creath et al. Eds., 2004.

Myung, "Tutorial on Maximum Likelihood Estimation", Journal of Mathematical Psychology, vol. 47, 90-100 (2003).

Furenlid et al., "Fast maximum-likelihood estimation methods for scintillation cameras and other optical sensors", Proc. SPIE, 6707, 2007.

* cited by examiner

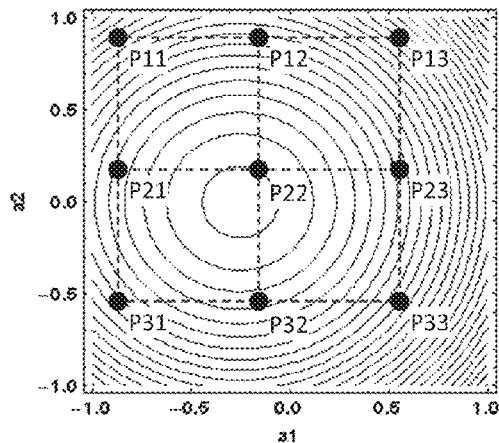
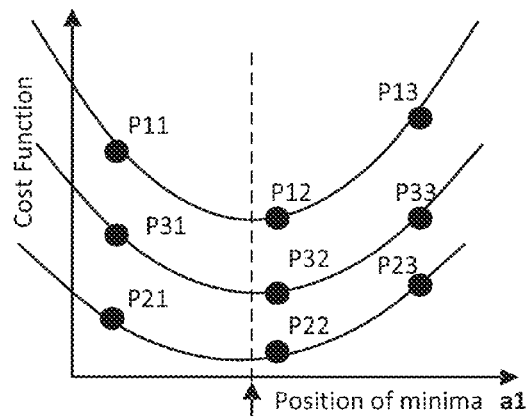
FIG. 23A  FIG. 23B
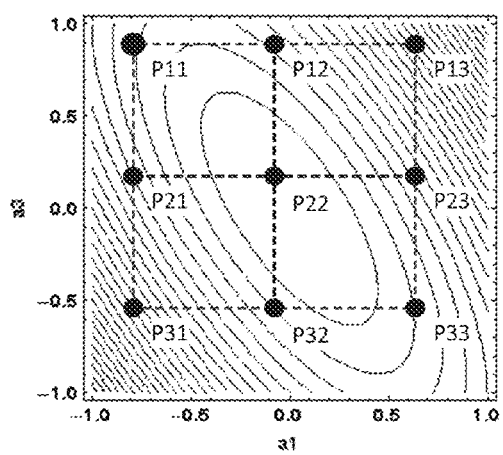
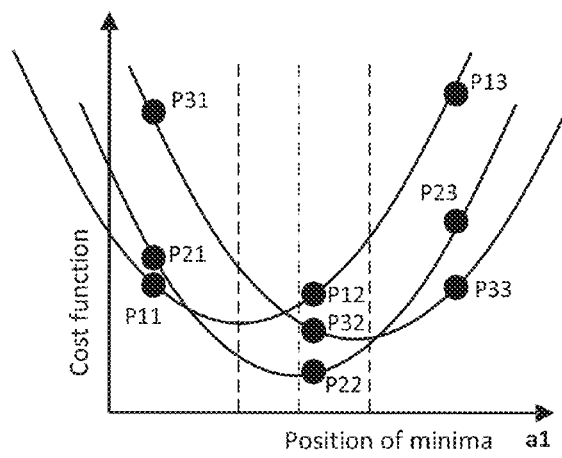
FIG. 24A  FIG. 24B

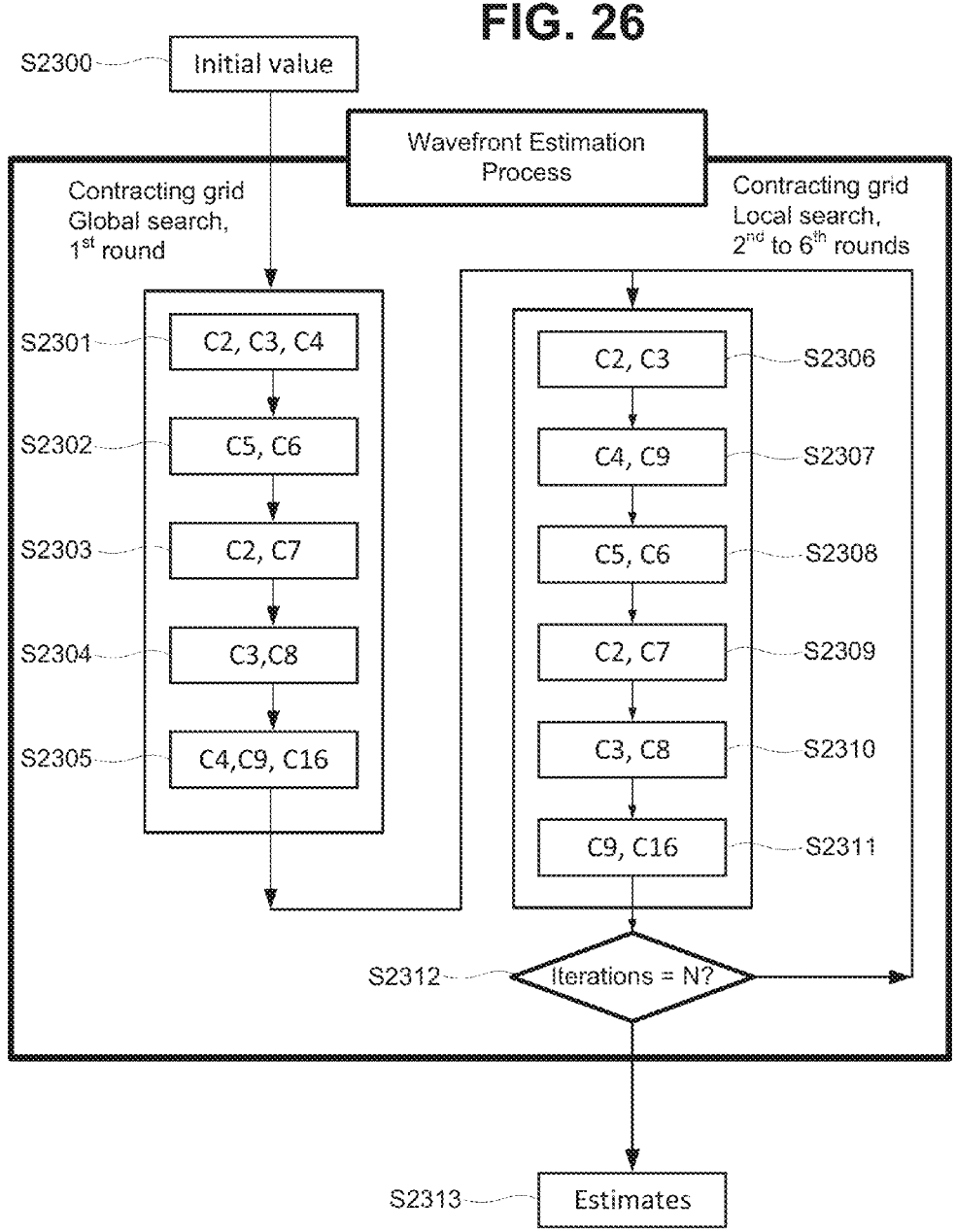

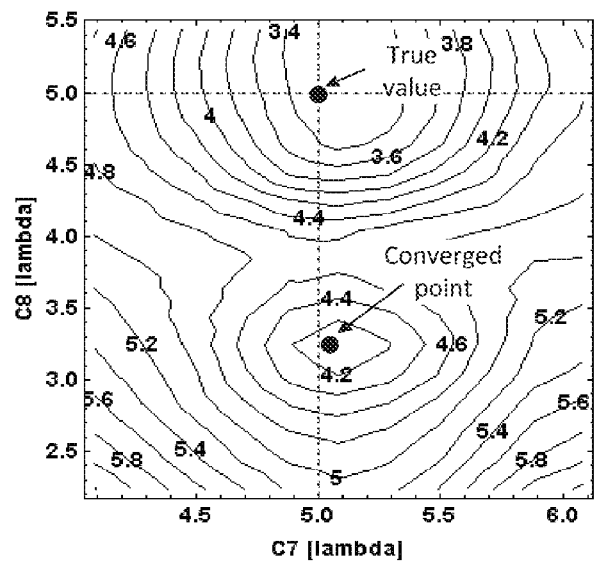
FIG. 28
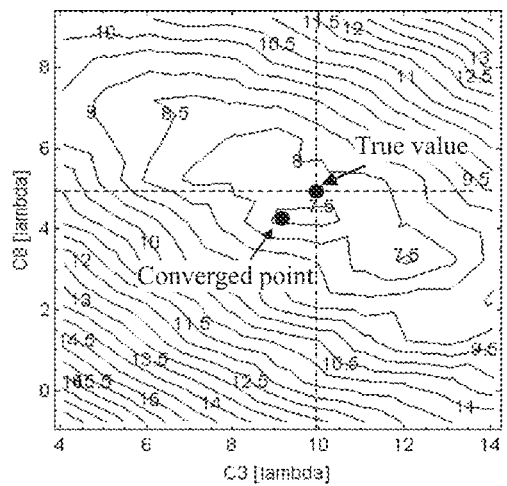 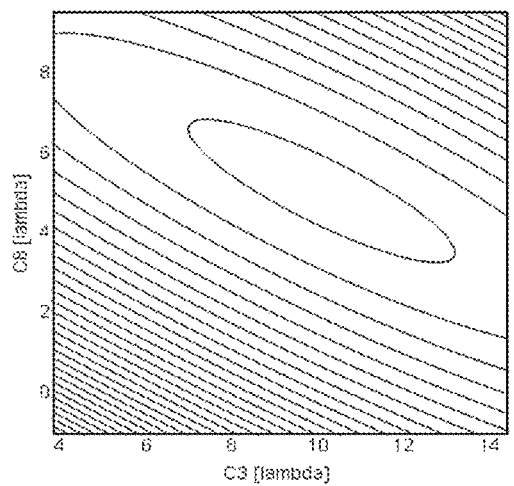
FIG. 29A　　　　　　　　　　FIG. 29B

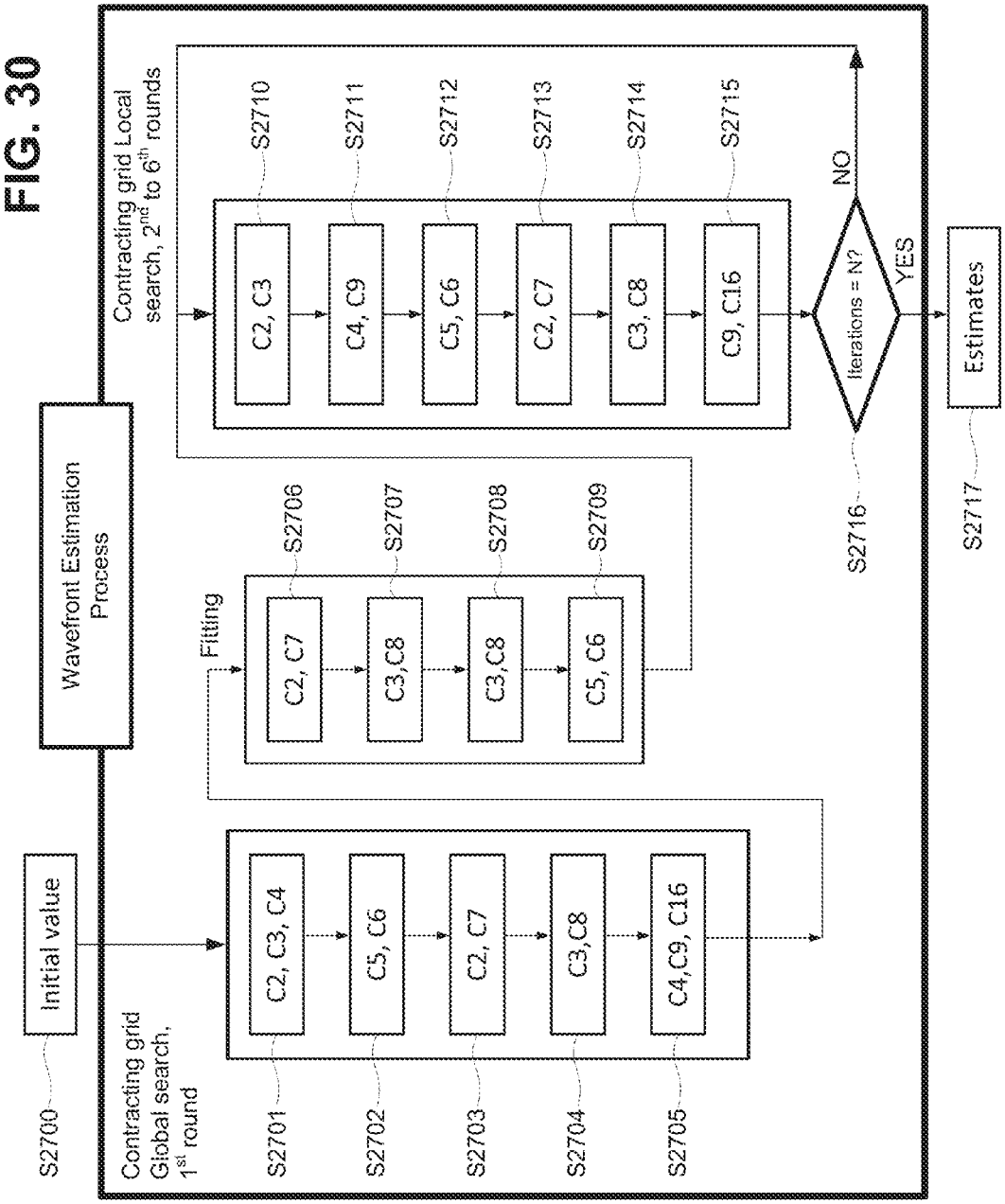

APPARATUS AND METHOD FOR ESTIMATING WAVEFRONT PARAMETERS

CROSS REFERENCE TO RELATED APPLICATIONS

This application claims priority from Provisional Application No. 61/547,583 filed Oct. 14, 2011, the disclosure of which is hereby incorporated by reference herein in its entirety.

BACKGROUND OF THE INVENTION

1. Field of the Invention

The present invention relates to an apparatus and a method for estimating optical wavefront parameters, such as wavefront shape and aberration.

2. Description of the Related Art

Wavefront measurements are typically used to test the quality of optical surfaces and evaluate optical performance of optical elements. Wavefront measurements are also used for alignment of high-accuracy optical systems. A wavefront is the locus (a line, or in a wave propagating in 3 dimensions, a surface) of points on which all light rays have the same phase. The simplest form of a wavefront is that of a plane wave, where rays of light are parallel to each other and strike a sensor with a planar wavefront. Propagation of a wavefront through optical elements, such as lenses and mirrors, generally changes the shape of the wavefront due to lens thickness, imperfections in surface morphology, variations in refractive index, and other factors. Undesired changes in the shape of the wavefront are known as aberrations. Thus, knowledge of the wavefront profile and correction of aberrations thereof are very important when designing optical elements, and evaluating the performance of newly designed optical systems. For example, before assembling a complete imaging system, it is necessary to verify performance of each optical unit (unit lens) included in such a system. Since each unit lens or single lens itself may have certain aberrations, it is necessary to control the quality of imaging lenses with high precision. One application for measuring large wavefront aberrations is in the testing of the center of curvature of aspheric optical elements, such as lenses or mirrors.

A conventional method of measuring the wavefront quality of a light beam employs interferometric wavefront sensors in which spatial filtering of a small portion of the light source beam is used to produce a spherical reference wave that is subsequently combined with the original wavefront to produce an interferogram. As it is well understood in the art, interference fringes in the interferogram can be analyzed to evaluate the quality of the light beam. However, dividing the original beam and recombining it with the reference beam tends to introduce system aberrations, for example due to optical-path errors and improper alignment of optical components. An alternative conventional method of wavefront measurement uses non-interferometric wavefront sensors (NIWFS), such as a Shack-Hartman wavefront sensor, which do not require dividing and recombining the original beam.

NIWFS, such as Shack-Hartmann wavefront sensors (SHWFS), have a greater dynamic range than interferometric sensors. One basic and commonly used configuration of a SHWFS sensor consists of a lenslet array and an optical detector (typically a CCD camera) located at the back focal plane of the lenslet array. The Shack-Hartmann wavefront sensor divides the wavefront of an incident beam being measured into a plurality of beamlets by using a two-dimensional (2D) lenslet array. Each lenslet in the lenslet array generates a separate and independent focus (spot) on the surface of the optical detector. The centroid position of each spot is displaced by a distance and direction indicative of the wavefront aberrations between a reference and distorted beam. Therefore, wavefront measurement by a SHWFS is based on an estimation of the local slopes of the aberrated wavefront relative to a reference (plane) wavefront. Generally, the wavefront estimation procedure may be categorized as either zonal or modal, depending on whether the phase is presented as a set of local slopes of the wavefronts or as a set of coefficients of some modal functions determined across the whole aperture. In the latter, displacements of focal spots can be represented in terms of Zernike polynomials.

There are several advantages to using SHWFS over interferometric counterparts. SHWFS have greater dynamic range than interferometric sensors. The incident radiation does not have to be coherent. Since the SHWFS can acquire all of the wavefront information from a single image, exposure times can be short, which reduces sensitivity to vibration. More importantly, both irradiance and phase distributions can be obtained with a SHWFS.

FIG. 1 illustrates an example of the configuration of a wavefront measurement apparatus 100 using a SHWFS. As illustrated in FIG. 1, the wavefront measurement apparatus 100 may typically include, a light source 102, a neutral density (ND) filter 104, a beam expander 106, a projection lens 108, test optics (test element or sample) 110, a lens group 112, a lenslet array (micro lens array) 114, an optical detector 116 (CCD sensor), and a data analyzer 118. Arranged in this manner, the wavefront measurement apparatus 100 is configured to characterize the effects that the sample (test optics 110) exerts on a wavefront of light that travels through it.

The optical configuration of a SHWFS is illustrated with more detail in FIG. 2. In FIG. 2, the optical detector 116 includes a sensor array 210, whereupon light passed through lenslet array 114 is incident. Locations of focal spots 250, 251, 252, 253 and 254 on the sensor array 210 are dependent on a local tilt of an incoming wavefront 150. The local tilt of the wavefront 150 is caused by aberrations in the test optics 110 in FIG. 1. The local tilt can be calculated by variation of focal spot location. The wavefront can be reconstructed by using the local tilt information obtained from lenslets of the lenslet array 114.

When the amount of wavefront deviation is within the dynamic range of the SHWFS, positions of each focal spot on the sensor array 210 can be detected separately and assigned to the correct lenslet; and a wavefront profile can be easily determined. However, if the wavefront deviation exceeds the dynamic range of the SHWFS, as illustrated in FIG. 3, the sensor array SHWFS cannot analyze the wavefront anymore. Specifically, in FIG. 3, the lenslet array 114 forms focal spots 350, 351, 352, 353 and 354. However, due to a highly aberrated wavefront 160, the focal spot 350 extends beyond the surface range of the sensor array 210; and focal spots 353 and 354 have crossed each other (spot crossover). That is, the beams forming the focal spots 353 and 354 overlap each other and are focused at crossover locations on the sensor array 210. In the situation illustrated in FIG. 3, since focal spot 350 is beyond the range of sensor array 210, focal spot 350 cannot be detected; and because of spot crossover, focal spots 353 and 354 cannot be unambiguously assigned.

FIG. 4 illustrates an example of output data from the sensor array 210 upon detecting an aberrated wavefront. In FIG. 4, a region of interest S, showing focal spots at the outer region thereof, has been enlarged to better illustrate the effects caused by focal spots crossing over each other or extending beyond the effective area of sensor array 210.

Techniques for extending the dynamic range of the SHWFS or for analytically compensating for wavefront aberrations have been previously proposed and continue to be developed. Some of the more popular techniques are summarized below.

(1) Null Lens

A null lens includes a set of optics specifically designed to compensate or nullify an expected wavefront aberration. Since the null lens technique can completely compensate the wavefront aberration of test optics (provided that there are no manufacturing errors), it can effectively cancel wavefront deviation on the lenslet array. However, with this technique, it is necessary to fabricate a highly accurate null lens for an accurate measurement. Therefore, the fabrication cost of a null lens can become prohibitively expensive. Furthermore, such a null lens is designed for specific test optics with an expected wavefront aberration, thus this technique may be not applicable to other wavefronts formed by test optics of different shapes or characteristics. An example of the null lens technique is described in U.S. Pat. No. 5,233,174 to Zmek, which is incorporated herein by reference.

(2) Estimation Techniques

Instead of the null lens technique, wavefront estimation techniques have been proposed for measuring aberrated wavefronts, and a corrective algorithm is typically used to correct or compensate for aberrations. One example of an estimation technique is disclosed in Ref. 1: Michael C. Roggemann, Timothy J. Schulz, Chee W. Ngai, and Jason T. Kraft, "Joint processing of Hartmann sensor and conventional image measurements to estimate large aberrations: theory and experimental results," Appl. Opt. 38, pp. 2249-2255 (1999).

Another wavefront estimation technique uses Maximum Likelihood Estimation (MLE) for wavefront reconstruction. An example of the MLE technique is disclosed in Ref. 2: Harrison H. Barrett, Christopher Dainty, and David Lara, "Maximum-likelihood methods in wavefront sensing: stochastic models and likelihood functions," J. Opt. Soc. Am. A. 24, 391-414 (2007).

(3) Stitching

U.S. patent application publication No. 2009/0284753 describes a technique in which a series of wavefront measurements are "stitched" together using mathematical methods. For each measurement, a different focus, wavefront tilt or reference aberration is used in conjunction with a dynamic-range-limiting aperture. Purportedly, this technique can effectively extend the dynamic range of the sensor. However, those of ordinary skill in the art should readily appreciate that performing a series of wavefront measurements and stitching those measurements together using mathematical methods is a computing-intensive process.

In view of the foregoing state of the art, the inventors herein have developed a novel technique for estimating wavefront parameters that can, among other advantages, shorten the time required for the measurement and analysis of such parameters while correctively canceling wavefront errors.

SUMMARY OF THE INVENTION

According to an aspect of the present invention, an apparatus for estimating wavefront parameters comprises a light source, a lenslet array, a detector for detecting light generated by the light source and passed through the lenslet array, a wavefront corrective element disposed between the lenslet array and the light source, and a data analyzer configured to estimate at least one wavefront parameter of the wavefront at a predetermined plane located on the light source side of the corrective element, wherein the lenslet array and the sensor array are arranged to form a non-interferometric wavefront sensor, and wherein the wavefront corrective element is configured to at least partially correct aberration of the wavefront.

According to another aspect of the present invention, a method for estimating a parameter of a wavefront, whose deviation is represented with Zernike polynomials, by using maximum likelihood estimation, comprises obtaining data by using a non-interferometric wavefront sensor, selecting an area for executing an investigation of symmetry of a cost function surface of the Zernike polynomial coefficients, executing the investigation in the area, deciding a combination of the Zernike polynomials to be optimized simultaneously, and executing an optimization for Zernike coefficients according to the combination.

According to a further aspect of the present invention, a method for estimating a wavefront parameter includes placing a test element between a light source and a non-interferometric wavefront sensor (NIWFS), directing light generated by the light source towards the test element such that a wavefront of the light travels through the test element and is detected by the SHWFS, at least partially correcting an aberration of the wavefront with a wavefront corrective element placed between the SHWFS and the test element such that the at least partially corrected wavefront is within the dynamic range of the SHWFS, and estimating, using a data analyzer, at least one parameter of the wavefront at a predetermined plane located on the light source side of the wavefront corrective element.

Further features of the present invention will become apparent to persons having ordinary skill in the art from the following description of exemplary embodiments with reference to the attached drawings.

BRIEF DESCRIPTION OF THE DRAWINGS

FIGS. 23A and 23B illustrate nine points of a symmetric cost function surface profile.

FIGS. 24A and 24B illustrate nine points of a non-symmetric cost function surface profile.

FIG. 26 illustrates a flow process for estimation of Zernike coefficients based on a contracting grid search algorithm.

FIG. 28 illustrates a cost function surface of the combination of coefficients {C7, C8}.

FIG. 29A illustrates a cost function surface of the combination of coefficients {C3, C8}.

FIG. 29B illustrates a fitting surface of parameters {C3, C8}.

FIG. 30 illustrates an improved optimization process for the estimation of Zernike coefficients based on a contracting grid search algorithm using a fitting method.

DESCRIPTION OF THE EMBODIMENTS

Exemplary embodiments according to the present invention are described below. As used herein, a wavefront may be considered as a locus (a line, or in a wave propagating in 3 dimensions, a surface) of points on which all rays of the wavefront have substantially the same phase. A "wavefront" will generally be described in terms of an optical wavefront. As will be appreciated by those having ordinary skill in the art, the terms "optical", "optic" or the like are not restricted to visible light, unless expressly stated. Specifically, it should be understood by one of ordinary skill in the art that there is a considerable range of energies in the electromagnetic spectrum that may generate a wave with substantially similar wavefront characteristics, whether it is in the infrared, visible, ultraviolet, or high energy ranges (e.g., X and gamma rays) of the electromagnetic spectrum. In addition, when referring to wavefront aberration, the term "aberration" should be understood as any deviation, including the sum of several deviations (beyond a minimum tolerance), from an expected, estimated, or established reference value. Therefore, a "correction" of a wavefront aberration may refer to reducing, minimizing, or compensating any deviation from the expected, estimated, or established reference value. Moreover, when referring to a wavefront "parameter" any value or group of values that characterize the tilt, shape, phase, surface, locus, speed, or the like of the wavefront can be considered.

One aspect of the present invention is related to an apparatus and a method for estimating wavefront parameters, such as wavefront shape and aberrations thereof, of an optical system. An exemplary setup of an apparatus 500 for estimating wavefront parameters, in accordance with one embodiment of the present invention is illustrated in FIG. 5.

Figure 1:
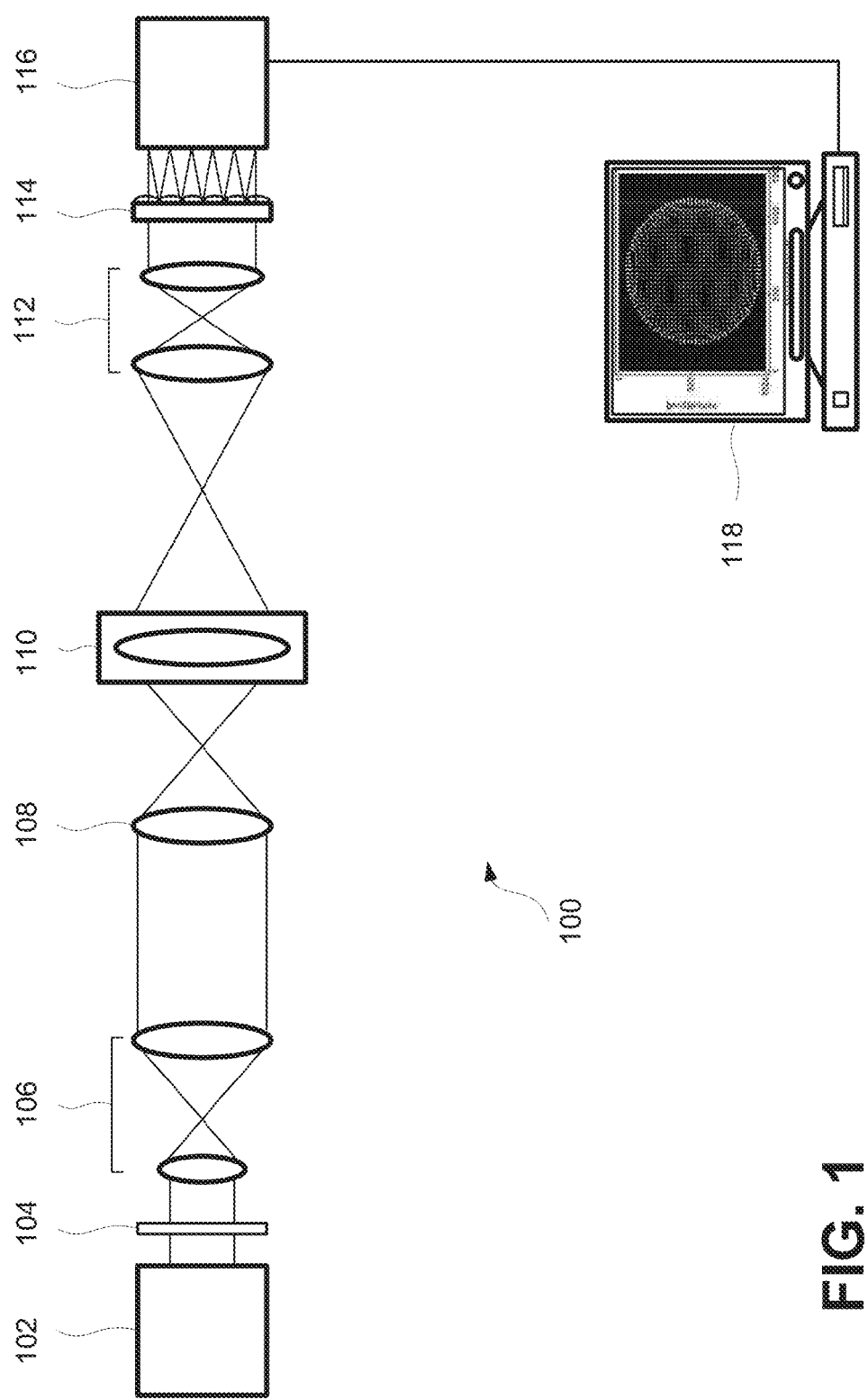
FIG. 1 illustrates an optical configuration of wavefront measurement apparatus using a Shack-Hartmann wavefront sensor (SHWFS).
Figure 2:
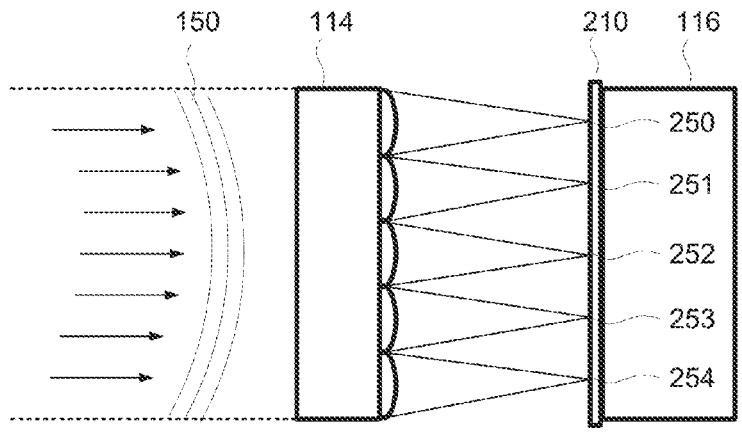
FIG. 2 illustrates an optical configuration of a SHWFS with a non-aberrated wavefront incident thereupon.
Figure 3:
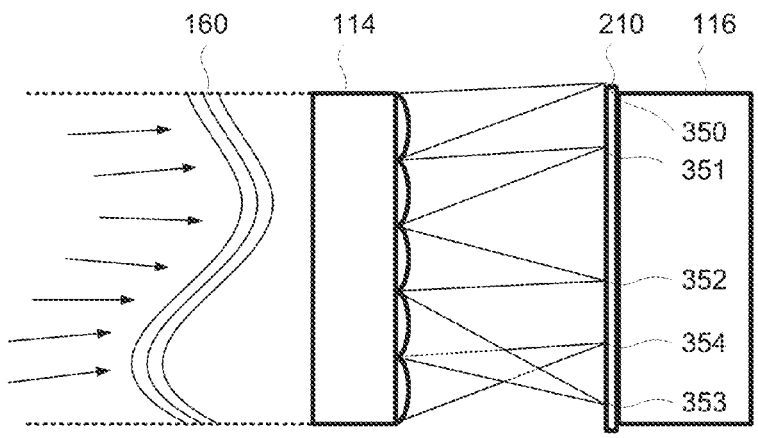
FIG. 3 illustrates an operation of a SHWFS when a highly aberrated wavefront is incident thereupon.
Figure 4:
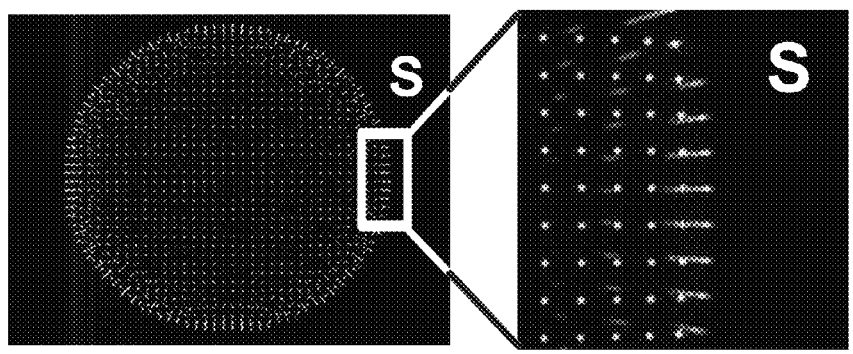
FIG. 4 illustrates output data obtained from a sensor array of a SHWFS when an aberrated wavefront is incident thereupon.
Figure 5:
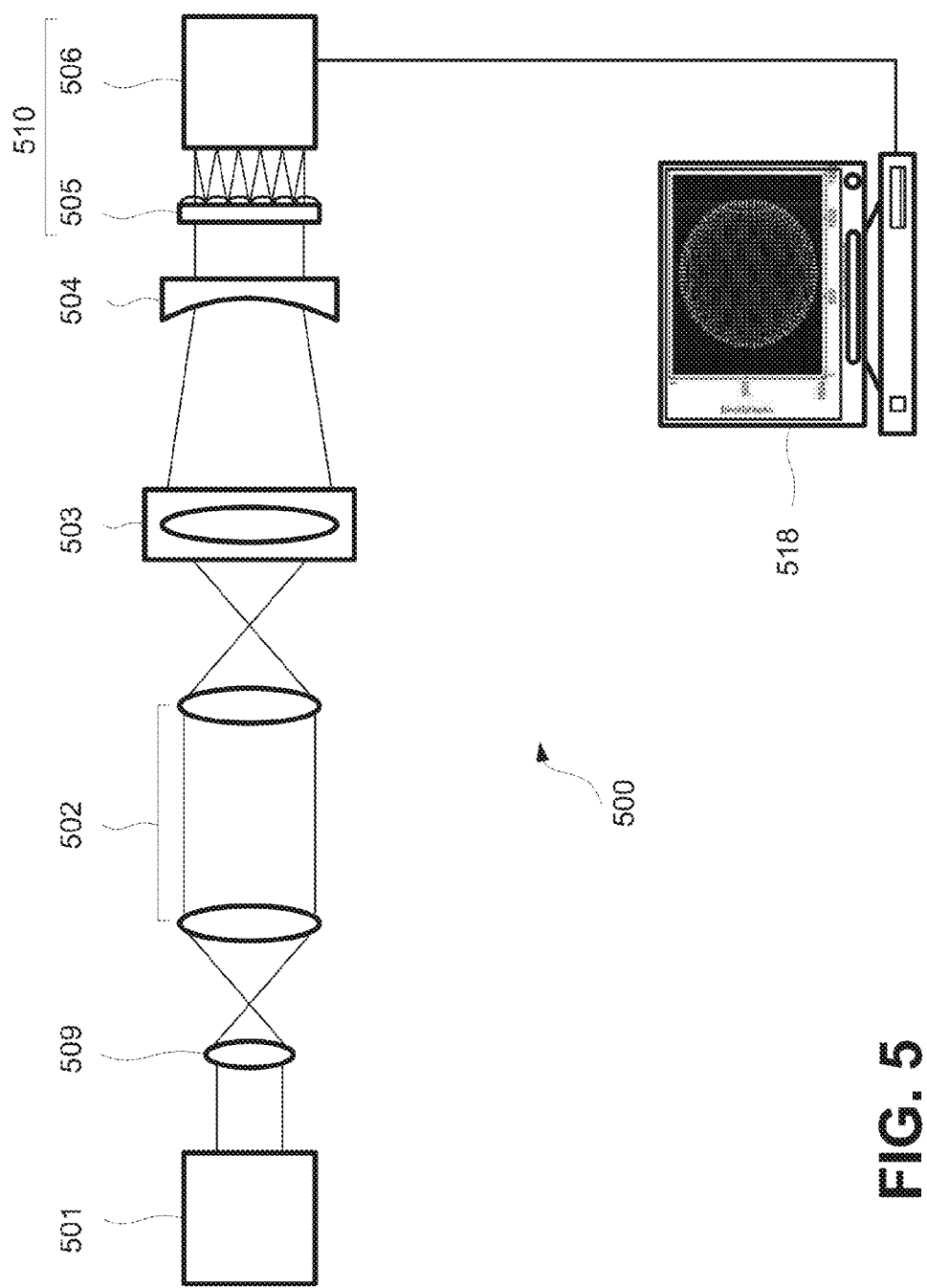
FIG. 5 illustrates an exemplary wavefront measurement apparatus for estimating wavefront parameters in accordance with one aspect of the present invention.

In FIG. 5, the apparatus 500 includes a light source 501, a wavefront sensor 510 and a data analyzer 518. The light source 501 may be implemented as a monochromatic light source that can be a collimated light source or a point source. An optical test element (i.e., an optical element under test) 503 is placed along an optical path between the light source 501 and the wavefront sensor 510. As necessary, a lens 509, and a beam expander 502 may be arranged between the light source 501 and the test element 503. An ND filter (not shown) may also be applied to this setup.

The wavefront sensor 510 is preferably implemented as a non-interferometric wavefront sensor (NIWFS). A lenslet array 505 and an optical detector 506 are arranged to form the non-interferometric wavefront sensor. In this embodiment, a Shack-Hartman wavefront sensor (SHWFS) is used as an example of a NIWFS. However, this embodiment is not limited to the SHWFS. There are many types of non-interferometric wavefront sensors, and each tends to have its own specific arrangement. Any instrument used to measure the wavefront parameters may be used as long as it is within the scope of the appended claims. In one aspect of the invention, a corrective element 504 (wavefront corrective element), such as a negative plano-concave lens is introduced on the light source side of the SHWFS. Specifically, the negative plano-concave lens, as an example of the corrective element 504, is placed between the test element 503 and the lenslet array 505. Light generated by the light source 501 travels through lens 509 and beam expander 502 to form a beam incident on the test element 503. After passing through the test element 503, the beam advances to the corrective element 504, and travels through the lenslet array 505 to the optical detector 506, such as a CCD sensor array. The intensity of the light incident upon the optical detector 506 is detected and a signal from the optical detector 506 can be electronically processed (analyzed) by a data analyzer 518. The data analyzer 518 performs computer-controlled data acquisition and storage. In the data analyzer 518, specialized software is used to fit the data, make various calculations, and display the data in graphical format.

The corrective element 504 (such as the negative plano-concave lens) includes a high-precision optical component or a group thereof that advantageously make the data acquisition and actual aberration estimation steps more accurate and more practical by partially or entirely correcting some aberration terms that make the uncorrected wavefront exceed the dynamic range of the SHWFS. Although the corrective element can be arranged anywhere between the light source 501 and the lenslet array 505, it is preferable to arrange the corrective element between the lenslet array and the test element. That is, the corrective element 504 is arranged on the light source side of the lenslet array 505. Instead of the single plano-concave lens, a single concave lens, a single convex lens, a single plano-convex lens, or a combination of the foregoing may be used as the corrective element 504 based on the features (characteristics) of the test element. Indeed, the corrective element 504 can even be integrated with the lenslet array 505 so that a surface of the corrective element 504 can be in contact with the lenslet array 505.

Figure 6:
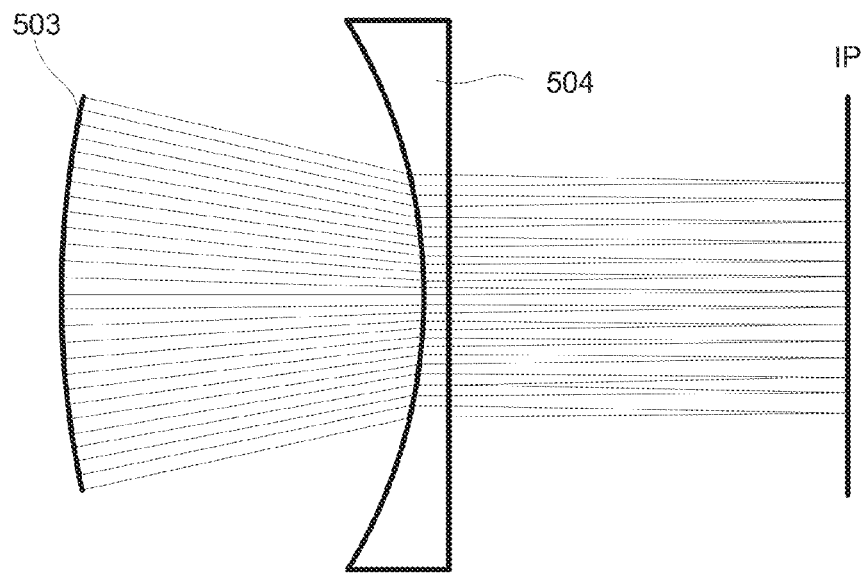
FIG. 6 illustrates a ray trace diagram from a test element to an optical detector with a wavefront corrective element therebetween.

FIG. 6 shows an exemplary ray-trace diagram from an exit surface of the test element 503 to the image plane IP (i.e., a plane where the sensor array of the optical detector 506 is located). The light, emerging from the last surface of the test element 503, is shown on the far left of the figure as a wavefront having a locus concave towards the image plane. In an experimental arrangement, the paraxial focus for this wavefront was 110.64 mm to the right of the last surface of the test element 503. To correct, or at least partially compensate for wavefront aberration, the corrective element 504 (e.g., a plano-concave lens with f=−75 mm, and ø50.8 mm) was placed after the test element 503. A 25-by-25 lenslet array (not shown) with a pitch of 1 mm and focal length of 40 mm was placed after (to the right in FIG. 6) the corrective element 504. For ease of implementation, the lenslet array can be fabricated on the flat surface of the negative lens (corrective element), or it can be placed adjacent thereto on the detector side of the corrective lens. An optical detector (506 in FIG. 5), including a 36-by-36 $mm^2$ square sensor array, is placed at the lenslet array's focal plane. At the focal plane of the lenslet array, each element of the sensor array in the optical detector receives beams of light formed by a corresponding lenslet in the lenslet array. Data from the entire sensor array can, in principle, be used to electronically reconstruct the wavefront of the beam of light incident upon the lenslet array.

The wavefront detected by the detector array can be expressed in many different ways. For example, the wavefront can be expressed in terms of a set of Zernike coefficients for the light field phase at an arbitrary plane or curved surface; the wavefront may also be expressed in terms of the phase thereof as samples on a grid; or the wavefront may be characterized by an analytical expression for the electric field phase. Indeed, several subsets of the data obtained from the sensor array associated with each single lenslet can be used to calculate local tilts of the wavefront, which are then used to estimate wavefront parameters at other planes of the optical system. In the case of adaptive optics for astronomical applications where the wavefront travels through the atmosphere the observed values of the local tilts and knowledge of the atmospheric conditions allow for simple and accurate estimation of wavefront parameters. However, contrary to the case of adaptive optics for astronomical applications, the wavefront in a manufacturing or experimental setup is highly aberrated and it noticeably deviates from a typical atmospherically-distorted wave. Thus, in precision optics, the observed values of the local tilts and knowledge of the atmospheric conditions do not allow for simple and accurate estimation of wavefront parameters.

Specifically, in the arrangement of FIGS. 5 and 6, light is assumed to propagate through air (or another known homogeneous medium) from the test element 503 to the corrective element 504 and then to the lenslet array 505. For the configuration shown in FIG. 6, if the wavefront from the test element 503 had a perfect spherical wave, the corrective element 504 would bend the light so that it would emerge from the corrective element 504 as collimated light. The lenslet array 505 is then placed after the corrective element 504 (not necessarily in direct contact). Each lenslet in the lenslet array 505 samples the local wavefront and produces an image on its corresponding region of the optical detector 506.

Figure 7A:
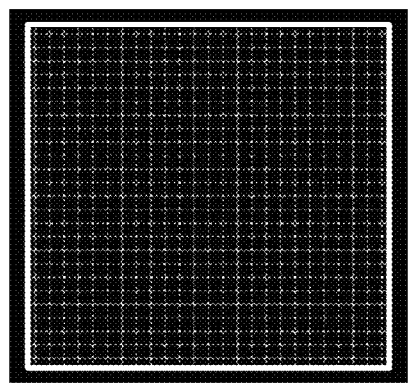
FIGS. 7A and 7B illustrate exemplary images detected by the optical detector with and without the test element, respectively.
Figure 7B:
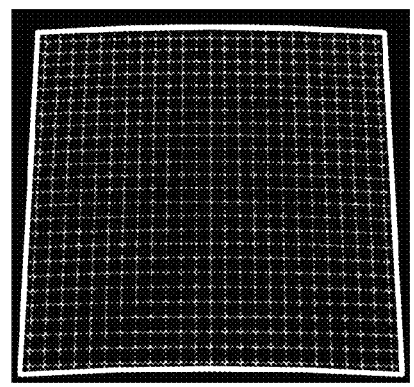

For the case of a substantially spherical wave emerging from the test element 503, the image on the optical detector 506 would look like the one shown in FIG. 7A. On the other hand, if the wave emerging from the test element 503 is at least somewhat aberrated, the image on the optical detector 506 might look like the one illustrated in FIG. 7B. By examining FIG. 6 and FIGS. 7A and 7B, it can be appreciated that each lenslet of the lenslet array 505 can produce a spot on the optical detector 506. Features of the spot pattern and of the spots themselves, such as slope of inclination and centroid location, depend on the aberration of the wavefront emerging from the test element 503, and on the optical and physical characteristics of the corrective element 504 and the lenslet array 505. However, in this aspect of the invention, the corrective element 504 is specifically designed (configured) to substantially reduce the aberration of the wavefront emerging from the test element 503, so that the wavefront estimation can be more easily performed.

Figure 8:
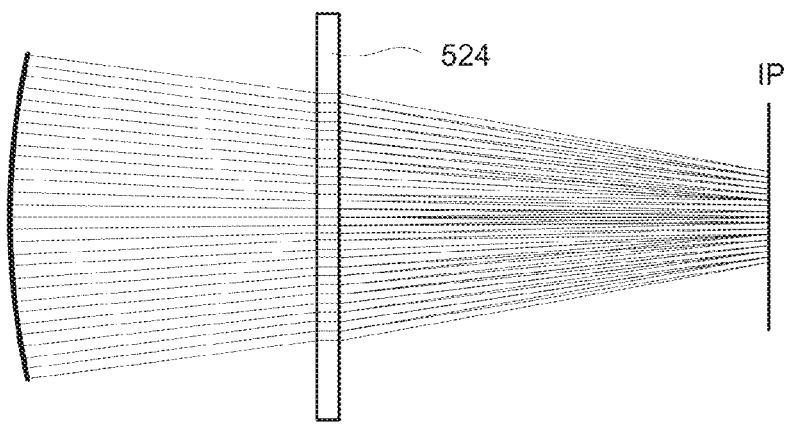
FIG. 8 illustrates a ray trace diagram from the test element to the optical detector with a plane-parallel plate therebetween.

More specifically, the usefulness of the corrective element 504 can be better understood by examining the ray trace illustrated in FIG. 8 and comparing it to FIG. 6. FIG. 8 illustrates a case where the corrective element 504 (shown in FIG. 6) has been removed and replaced with an optically transparent plane-parallel plate 524. The lenslet array 505 and the optical detector 506 are unchanged with respect to those of FIG. 6. From FIG. 8, it can be appreciated that without the corrective element 504, the rays from the individual lenslets would be concentrated on a central region of the optical detector 506. Furthermore, in the case of FIG. 8, contrary to the case of FIG. 6, focal spots from individual lenslets are likely to cross into neighboring lenslet's detector regions (spot crossover).

In other words, with a highly aberrated wavefront, the focal spots in a Shack-Hartmann wavefront sensor are not simple spots aligned in a more or less regular grid. Instead, the spots are spread out in complicated ways, possibly overlapping and interfering with the spots produced by adjacent lenslets. In principle, these complicated patterns are rich in information about the wavefront being measured, but in practice it can be very difficult to interpret them accurately and in a reasonable amount of time.

From a comparison of FIG. 6 with FIG. 8, it can be appreciated that the addition of an appropriately designed corrective element, such as a negative lens on the light source side of the lenslet array, can serve to cancel or reduce the large contribution from defocus and low-order spherical aberrations in the aberrated wave, leaving a residual aberration small enough to permit well delineated focal spots across, but contained within, the entire surface of the detector. In other words, the corrective element 504 in the form of a negative concave lens or the like may at least partially correct a wavefront aberration caused by the test element 503 and expand the dynamic range of the wavefront sensor, so as to facilitate expedited estimation of wavefront parameters at virtually any plane on the sensor side of the test object in the wavefront estimation apparatus.

A ray trace of the setup shown in FIG. 6 can be effectively used as a forward model in an iterative procedure to estimate the parameters of the wavefront emerging from the test element 503. The estimation process can be carried out by maximum-likelihood (ML) estimation of the wavefront parameters. The maximum-likelihood problem is generally formulated as a search over a parameter space and is given by, Eq. (1)

$$\hat{\theta}_{ML} = \arg\max_{\theta} \{pr[g|\theta]\} \qquad (1)$$

where θ is a vector of parameters, g is a vector of observations (data), $\hat{\theta}$ is the vector of estimated model parameters. The general problem to be solved is posed in the form of the following question: given a set of observations g, what is the set of parameters θ that has the highest probability (maximum likelihood) of generating the observed data?

In the present case, the input to the ML estimation algorithm is a set of spot features observed at the optical detector.

Features that can be considered for each spot include centroid, kurtosis, skewness, variance, pitch, and so on. The set of these features comprises the measured (observed) noisy data and is denoted as g. Notice that g can be calculated from the image collected by the optical detector. Features can also be calculated from the wavefront parameter vector θ, by calculating ray trace diagrams as shown in FIG. 6 using them to compute an irradiance pattern on the detector. In this case, a set of features of the wavefront parameter obtained at the detector will be denoted as $\bar{g}(\theta)$. With this notation, the ML estimation can be expressed mathematically, by Eq. (2)

$$\hat{\theta}_{ML} = \arg\max_\theta \{pr[g|\bar{g}(\theta)]\} \qquad (2)$$

where $\hat{\theta}_{ML}$ denotes the ML estimate of θ and the quantity $pr[g|\bar{g}(\theta)]$ is the probability of measuring the feature vector g, conditioned on the assumption that the "actual" feature vector is $\bar{g}(\theta)$.

Many efficient algorithms, such as conjugate gradient search, steepest descent search, simulated annealing, contracting-grid search and so on, are available to solve the maximization problem above. As an example, a detailed description of the contracting-grid search is presented below as it applies to a forward propagation model. Persons having ordinary skill in the art may readily implement the contracting-grid search algorithm. As an example of a possible application, estimation of wavefront parameters at a different plane before the corrective element 504 (such as at the exit surface of the optical element being tested) can be accomplished by back-propagating the field at the lenslet array to the plane of interest. That is, in the aspect of the invention, the estimation of wavefront aberration caused by test element 503 can be performed by back-propagating the wavefront parameters from the image plane to a plane between the corrective element 504 and the test element 503. Back-propagation is performed by numerical calculation. Either ray-tracing or Fourier optics techniques may be used to perform such numerical calculations. In performing back-propagation, however, accuracy and processing time of the back-propagation algorithm should be carefully analyzed. Considerations of processing times are discussed below with reference to Equations (5) to (15). Examples of back-propagating algorithms are described in Ref. 4: Krieg et al., "Inverse propagation algorithm for angstrom accuracy interferometer," in Interferometry XII: Techniques and Analysis, Vol. 5531, Proceedings of the Society of Photo-Optical Instrumentation Engineers (SPIE), Creath et al. Eds., 2004.

It should be noted that, as discussed above, non-interferometric sensors, and in particular Shack-Hartman wavefront sensors, are generally ineffective for testing optical elements with large focus/defocus terms (highly aberrated wavefronts) because the wavefront deviation tends to exceed the dynamic range of these sensors. In the foregoing description it has been shown that, by using an appropriately designed corrective element placed between the test element and a conventional SHWFS, the corrective element can effectively compensate, at least partially, for the large focus/defocus or other high-amplitude aberrations of the wavefront being analyzed, and leave only low-amplitude aberrations to be resolved. In addition, since the corrective element is not strictly required to be in contact with the lenslet array, the separation between the corrective element and the lenslet array can be changed in accordance with a particular estimation problem, for example, based on an expected level of aberration of the wavefront being analyzed.

In one embodiment, the wavefront can be represented with Zernike polynomials, and the estimation of the wavefront parameters can be executed by the optimization of the Zernike coefficients using a forward propagation model from a predetermined plane on the detector side of the exit surface of the test element. If the wavefront must be determined at other planes on the light source side of the predetermined plane, wavefront parameters can be estimated by back-propagation from said predetermined plane.

A maximum likelihood estimation (MLE) technique is used for the estimation of wavefront parameters. Although MLE is a well known estimation method, it has been considered too computationally intensive to be of practical use for higher dimensional problems. As discussed above, Ref. 2 discusses in detail one example of the MLE technique. Another example is provided by Ref. 3: Jae Myung, "Tutorial on Maximum Likelihood Estimation", Journal of Mathematical Psychology, Vol. 47, 90-100 (2003). As described below, the present application introduces the use of the contracting grid method to make the MLE practical for wavefront estimation.

In general performing estimation with the MLE technique requires knowledge of the probability of data, given the parameters to estimate. A probability distribution function (PDF) is denoted by pr(g|θ), where g is the observed data vector which is characterized by an M×1 vector, and θ is the parameter vector which is characterized by a P×1 vector.

Likelihood of θ is denoted by Eq. (3)

$$L(\theta|g) = pr(g|\theta) \qquad (3).$$

The maximum likelihood (ML) estimate of θ, given the observed data g, is defined by Eq. (4)

$$\hat{\theta}_{ML} = \arg\max_\theta \ln L(\theta|g). \qquad (4)$$

In a practical case, it is not usually possible to obtain an ML estimate analytically, but ML estimation can be executed numerically. Numerical optimization of likelihood is iteratively performed in the nonlinear optimization method. To find the appropriate parameters (Zernike coefficients in the present case), the calculation can be executed repeatedly while the values of the parameters are changed towards their convergence values. The calculation of the predicted $\bar{g}(\theta)$ can be called a forward model. For this numerical optimization, some methods use derivative functions in their algorithm. For example, the conjugate gradient search method or steepest descent search method is commonly used for the optimization algorithm.

Since computational time for a calculation using the derivative function may be very time consuming and resource intensive, derivative-free algorithms are more efficient, and thus preferred.

Several derivative-free algorithms have been proposed. The contracting-grid search algorithm has been proposed as a simple and efficient algorithm for parallel processing. The reader is referred to, for example, Ref. 5: L. R. Furenlid, J. Y. Hesterman, and H. H. Barrett, "Fast maximum-likelihood estimation methods for scintillation cameras and other optical sensors", Proc. SPIE, 6707, 2007. The contracting-grid search algorithm allows identification of a maximum (or minimum) value of a function in a predetermined number of iterations that depends on the desired level of precision. The optimization process in this search method is explained in Ref. 5 in detail, but for convenience it is summarized here as follows. The implementation of the algorithm is applied to the searching of an N-dimensional space containing the M×1 vector of parameters θ. For each parameter:

1. Pad the region around the physically reasonable parameter space with an area (volume or hyper-volume depending on number of parameters and thereby dimensionality of search) that yields vanishingly small (substantially zero) likelihood regardless of data vector values. This allows test locations in step 3a (infra) to probe outside the allowable domain of estimates without the possibility of being returned as the highest likelihood without the use of conditional tests ("if/then statements" in software). (Alternatively, at a slight cost in execution speed, use conditional statements to ensure that only locations within the physically reasonable parameter space are tested.)

2. Pre-compute all terms in the likelihood expression that depend only on calibration data (or prior knowledge).

3. For i=1 to the number of iterations required to resolve the estimates to the desired precision:

a. Compute the likelihood or log likelihood at test locations defined as the centers of squares (cubes or hypercubes) that cover the parameter region under test.

b. Select the location with the highest (or lowest if minimizing) likelihood or log likelihood as the center of the next iteration's region of test.

c. Decrease the size of the region of test by a contraction factor (e.g., by a factor of 2) in each dimension.

Figure 9:
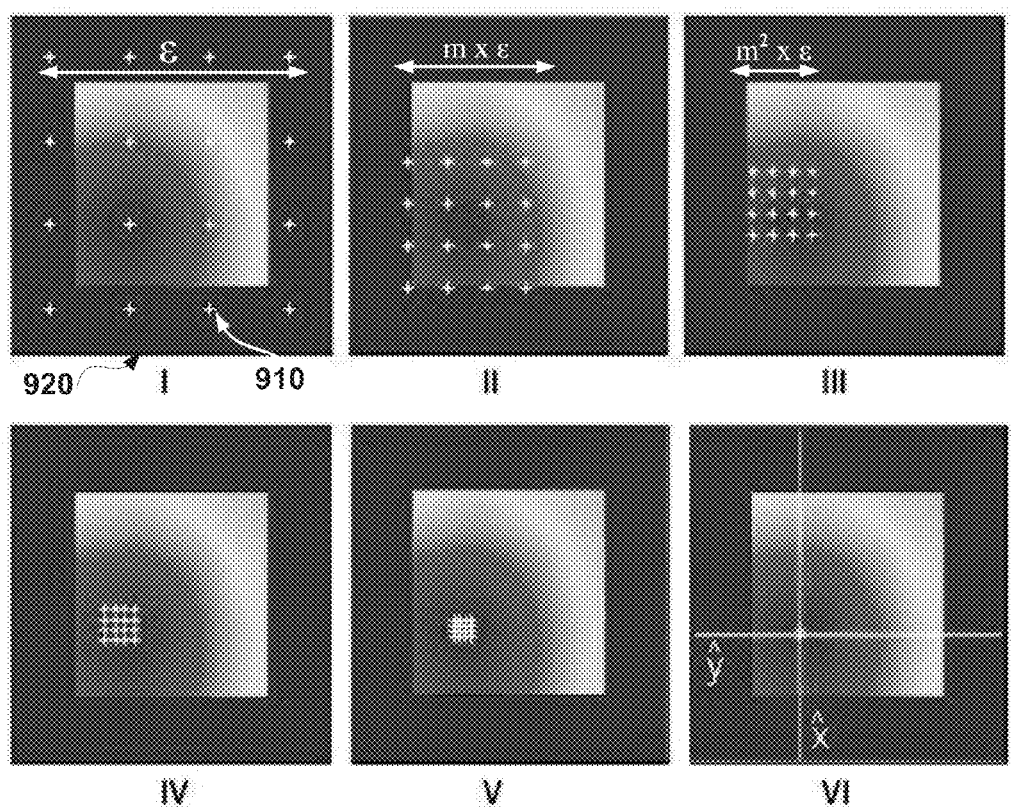
FIG. 9 graphically illustrates an optimization process by using a contracting-grid search algorithm.

A graphic example of the contracting-grid search method is illustrated in FIG. 9, in progressive steps from I to VI. The goal here is to determine which set of coefficients of the various Zernike polynomials has the largest (maximum) likelihood. In FIG. 9, in step (I), within an area 920 (search space), a grid of sixteen points 910 is set in a predetermined search range E. The number and the separation of the points 910 can be defined based on the level of precision desired. After the points 910 have been defined within the initial search range E, the likelihood is computed at these sixteen points. The appropriate point with the largest (maximum) likelihood is selected. In step (II), a new grid is defined centered on the maximum value found in step (I). The separation of the points in the new grid (contraction factor) is half that of the previous grid; and a new maximum is found. The search range including the appropriate point with the largest (maximum) likelihood will be reduced gradually by the contraction factor, as illustrated in FIG. 9 from stage (I) to stage (VI).

Now computational time for this contracting-grid search method is considered. To that end, the following notations are defined.

P: Number of parameters to be optimized
$\epsilon_p$: Initial search range for optimization, $p=\{1, 2, \ldots, P\}$
$m_p$: Demagnification ratio (contraction factor) after updating each parameter (calculation of likelihood distribution), $p=\{1, 2, \ldots, P\}$
$N_p$: Number of iterations of calculation for likelihood distribution, (in FIG. 9, $N_p$=6)
$l_p$: Number of calculation points for likelihood distribution on a side of the search area, $p=\{1, 2, \ldots, P\}$ (in FIG. 9, l=4)

In a derivative free optimization method, most of the computational time is for a forward model calculation. Therefore, a total computational time $t_{MLE}$ for the MLE is estimated as follows, by Eq. (5)

$$t_{MLE} = t_f N_{total} \quad (5)$$

where $N_{total}$ is the total number of the forward model calculations, $t_f$ is the computational time for one forward model calculation.

In simultaneous optimization of all parameters, the total number of calculation points for a forward model $N_{total}$ is given by Eq. (6)

$$N_{total} = N_{max}{}^P, \text{where}(N_{total} = N_{max} l_1 l_2 \ldots l_i \ldots l_p) \quad (6)$$

where it is considered that all of $l_p$ is equal to l, and all of Np is equal to Nmax. In case of l=4, P=9, $N_{max}$=6 and $t_f$=10 seconds, $t_{MLE}$ is calculated by Eq. (7)

$$\begin{aligned} t_{MLE} &= t_f N_{max} l^P \\ &= 10 \times 6 \times 4^9 / 3600 \text{ (hours)} \\ &\approx 4369 \text{ (hours)} \end{aligned} \quad (7)$$

This time (approximately 4369 hours) can be impractical for most applications. Therefore, a small dimension of search space is preferable for the contracting-grid search technique.

For example in FIG. 9, $N_{total}$=6×4²=96 points. When $N_{total}$ in non-simultaneous optimization is considered, the number of parameters P can be divided by the number of groups G. The number of parameters in each group is $k_g=\{k_1, k_2, \ldots, k_G\}$ and number of iterations for each group is $N_g=\{N_1, N_2, \ldots, N_G\}$. $N_{total}$ then becomes Eq. (8)

$$N_{total} = N_1 \prod_{j=1}^{k_1} l_j + N_2 \prod_{j=k_1+1}^{k_2} l_j + \ldots + N_G \prod_{j=k_{G-1}+1}^{k_G} l_j \quad (8)$$

$$= \sum_{i=1}^{G} \left( N_i \prod_{j=k_{i-1}+1}^{k_i} l_j \right)$$

where $k_0$=0.

If $l_g=\{l_1, l_2, \ldots, l_G\}$, Eq. (8) becomes Eq. (9)

$$N_{total} = \sum_{j=1}^{G} N_j l_j^{k_j}. \quad (9)$$

When the number of iterations for each group is $N_{max}$, Eq. (8) becomes Eq. (10)

$$N_{total} = N_{max} \sum_{j=1}^{G} l_j^{k_j}. \quad (10)$$

In sequential optimization for each parameter, the number of iterations becomes $N_p$, in each optimization. Using Eq. (10), $N_{total}$ becomes Eq. (11)

$$N_{total} = \sum_{j=1}^{P} N_j l_j, \quad (11)$$

where $$P = \sum_{j=1}^{G} k_j. \quad (12)$$

When $N_p$ and $l_p$ are constant in each parameter, Eq. (8) can be simplified as to obtain Eq. (13).

$$N_{total} = N_{max} P l \quad (13)$$

In a case where "n" parallel processors can be used, the number $n_{CPU}$ can be considered. Then, using Eq. (9), the total number of the forward model calculations for each processor becomes Eq. (14)

$$N'_{total} = \sum_{j=1}^{G} N_j \left\lceil \frac{l_j^{k_j}}{n_{CPU}} \right\rceil. \quad (14)$$

Eq. (14) shows that the number of the forward model calculations for each processor can be reduced. For example, 9 parameters (i.e., P=9) are grouped into 3 groups, each of which has 3 parameters.

In this case, G=3 and $k_g$={3, 3, 3}. Using Eq. (5) and (14), in case of l=4, P=9, $N_{max}$=6 and $t_f$=10 seconds, $t_{MLE}$ becomes Eq. (15)

$$\begin{aligned} t_{MLE} &= t_f N'_{total} \quad (15) \\ &= t_f \sum_{j=1}^{G} N_j \left\lceil \frac{l_j^{k_j}}{n_{CPU}} \right\rceil \\ &= 10 \times (6 \times 4^3/64 + 6 \times 4^3/64 + 6 \times 4^3/64) \\ &= 180 \text{ (seconds)} \end{aligned}$$

Therefore, the contracting-grid search algorithm with parallel processing can be an efficient search method if the dimension of search space is small. For example, 4 parameters can be optimized in the optimization method as follows.

First, let the set of parameters a form a group of parameters A, such that A={a1, a2, a3, a4}.

Then, the parameter set A is divided into two groups: A1={a1, a2} and A2={a3, a4}. The parameters in the group A1 and those in group A2 can be optimized simultaneously. Initial values of parameters are set, for example, {a1, a2, a3, a4}={0, 0, 0.5, 0}. True values are {a1, a2, a3, a4}={0, 0, 0, 0}, respectively.

Figure 10:
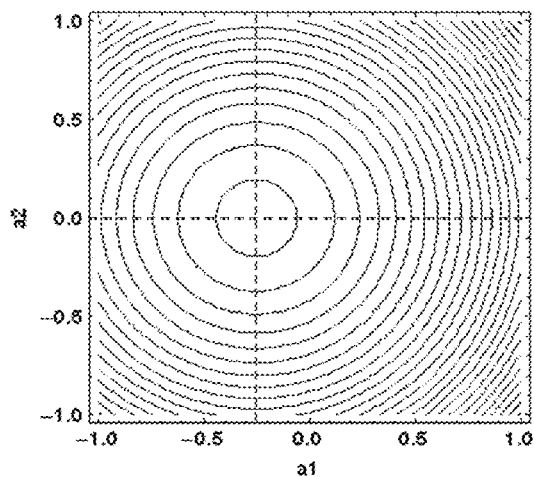
FIG. 10 illustrates a cost function surface profile in the search space of parameters {a1, a2}.

The normalized cost function corresponds to the negative of the log-likelihood function. The Zernike coefficients that give the minimum of the cost function are the maximum likelihood estimated values. The cost function is related to the square of the difference between the experimental data and the calculated data at each pixel of the optical detector. In the present embodiment, for purposes of illustration, the optical detector includes a sensor array assumed to form a matrix of 1280×1024 pixels. When a cost function surface profile in the search space of {a1, a2} becomes as shown in FIG. 10, optimum value of {a1, a2} will be converged to {−0.25, 0.0} using an optimization method such as the contracting-grid algorithm.

Figure 11:
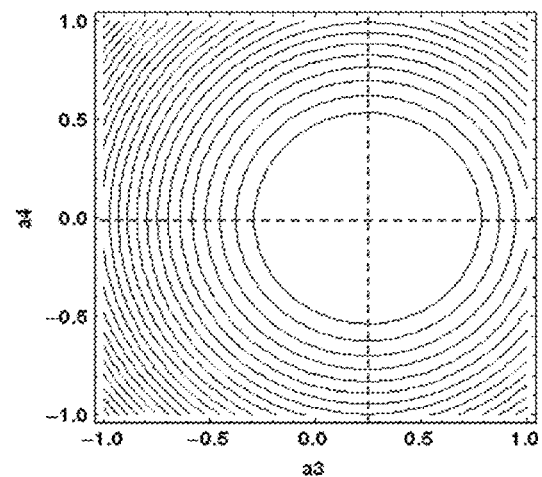
FIG. 11 illustrates a cost function surface profile in the search space of parameters {a3, a4}.

After that, {a3, a4} will be also optimized as {0.25, 0.0} as shown in FIG. 11. As a result, {a1, a2, a3, a4} are optimized as {−0.25, 0, 0.25, 0}.

There is a difference between optimized values and true values. If this forward model is a linear function of {a1, a2, a3, a4}, this optimization result is near optimum.

Figure 12:
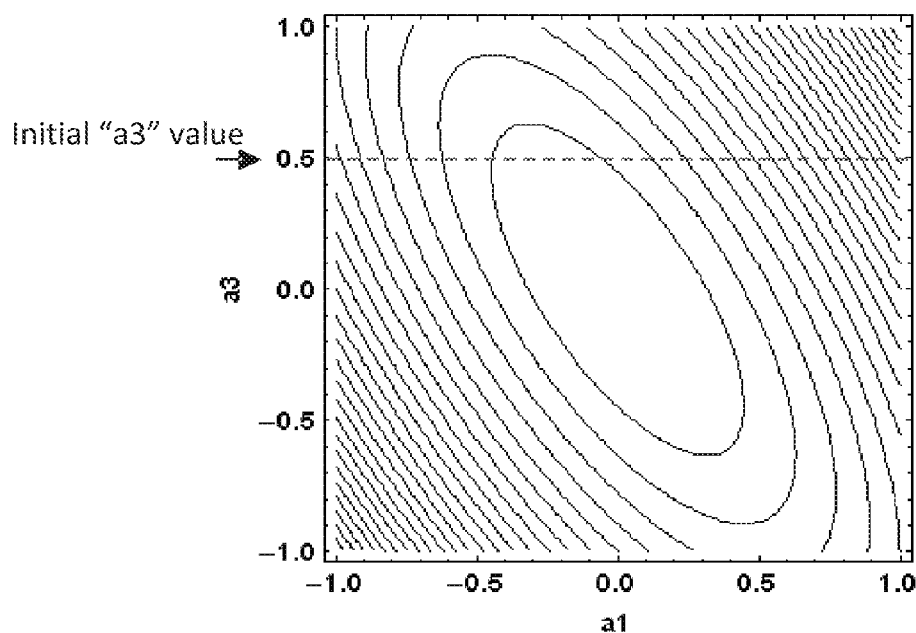
FIG. 12 illustrates a cost function surface of the combination of parameters {a1, a3}.

However, in a typical case, a forward model is a non-linear function. In that case, the forward model is a non-linear function of {a1, a3}. Thus, the cost function surface of the combination of {a1, a3} becomes as shown in FIG. 12. In this example, the initial value of a3 is 0.5 which is a bias of 0.5 from true value 0.0. Therefore, when {a1, a2} is optimized with a3=0.5, a1 is optimized to −0.25 which is a bias. As a result, the optimized point is seen to converge towards local minima, which are different from true target values.

In the second embodiment of the present invention, a solution to the problem of optimized parameters converging towards local minima different from true target values is proposed, so that accuracy of the estimation is improved.

Figure 13:
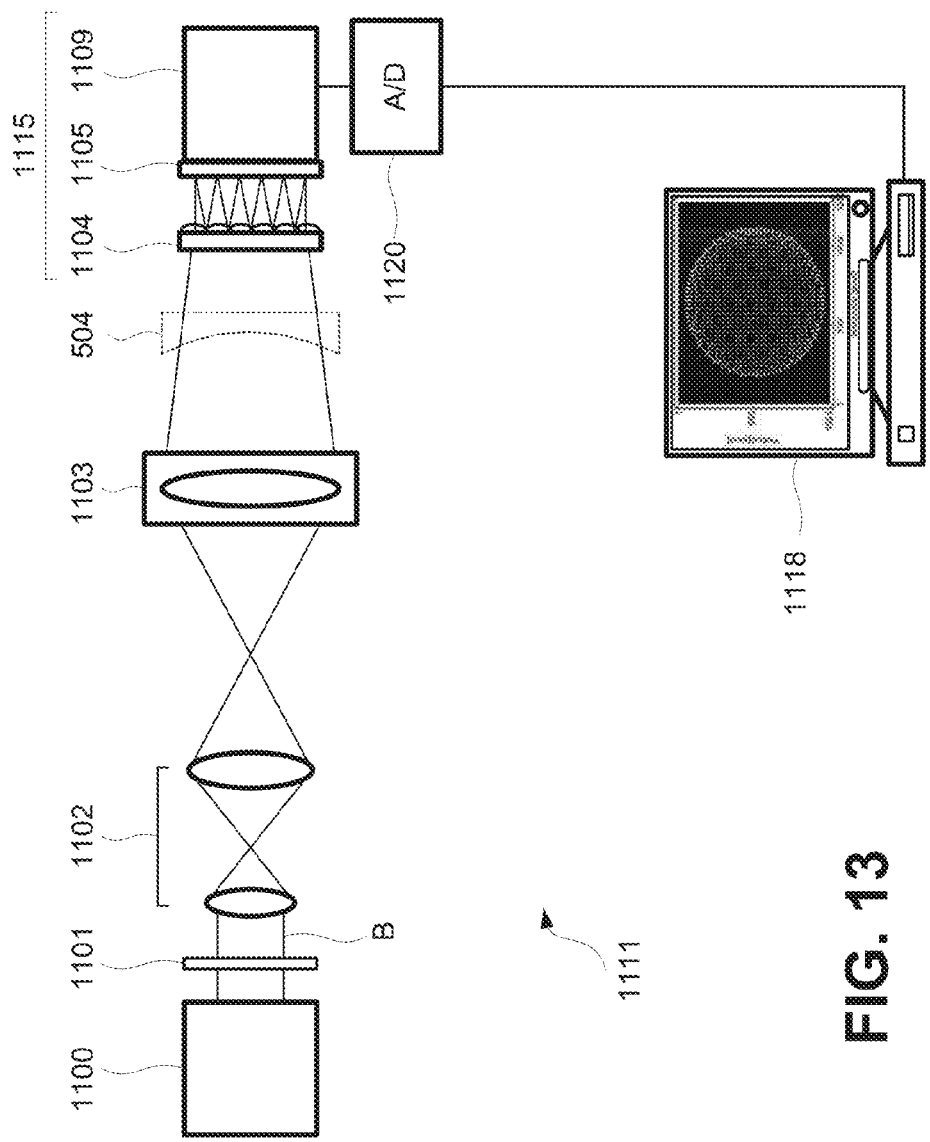
FIG. 13 illustrates an exemplary wavefront measurement apparatus for estimating wavefront parameters in accordance with a second aspect of the present invention.

FIG. 13 illustrates the configuration of a wavefront measurement apparatus 1111, in accordance with the second embodiment of the present invention. The wavefront measuring apparatus 1111 includes a light source 1100, wavefront sensor 1115 and a data analyzer 1118. The light source 1100 emits a light beam B, the light beam passes through filtering optics 1101 (e.g., ND filter), is shaped by illumination optics 1102; and then the shaped beam illuminates a test element 1103. The test element 1103 can be a single optical element, such as a lens, prism, waveguide or the like, or it can be a combination of optical elements. In order to compensate (reduce) wavefront aberrations introduced by the test element 1103, a corrective element 504 (as described in the first embodiment) can be optionally disposed between the lenslet array 1104 and the test element 1103.

The light beam passes through test element 1103 and advances to a lenslet array 1104, and then proceeds to an optical detector 1109 that includes a sensor array 1105, which in turn detects a light intensity distribution generated by this optical system.

The optical detector 1109 with its sensor array 1105 can output a signal that has information of all of this optical system. Output from the optical detector 1109 can be digitized in a known manner, for example using analog-to-digital (AD) converters in a data acquisition system 1120. The digitized data are then subsequently analyzed by the data analyzer 1118. The data analyzer 1118 analyzes various optical parameters regarding this optical system including the test element 1103. The data analyzer 1118 performs computer-controlled data acquisition and storage. In the data analyzer 1118, specialized software is used to fit the data, make various calculations, and display the data in graphical format.

As the light source 1100, a coherent light source, such as a pulsed or continuous wave (CW) laser, or a non-coherent light source, such as a mercury or tungsten lamp, can be used. In the case of a CW laser or a lamp, a modulation device such as an optical chopper may be required to modulate the light beam. Illumination optics for shaping the light beam are considered to be well known to persons of ordinary skill in the art and will not be described herein. For the lenslet array 1104, a variety of lenslet arrays (one- and two-dimensional) are readily available from commercial suppliers well known in the art. The specific parameters, such as shape, pitch and focal length of the lenslets in the array will generally depend upon the specific applications of the measuring apparatus. Similarly, the sensor array 1105 may be implemented as a single CCD camera, as it is well known in the art. Alternatively, the sensor array 1105 may be implemented as a one- or two-dimensional CMOS sensor array that can be specifically designed, for example, using Very Large Scale Integrated (VLSI) electronics.

Figure 14:
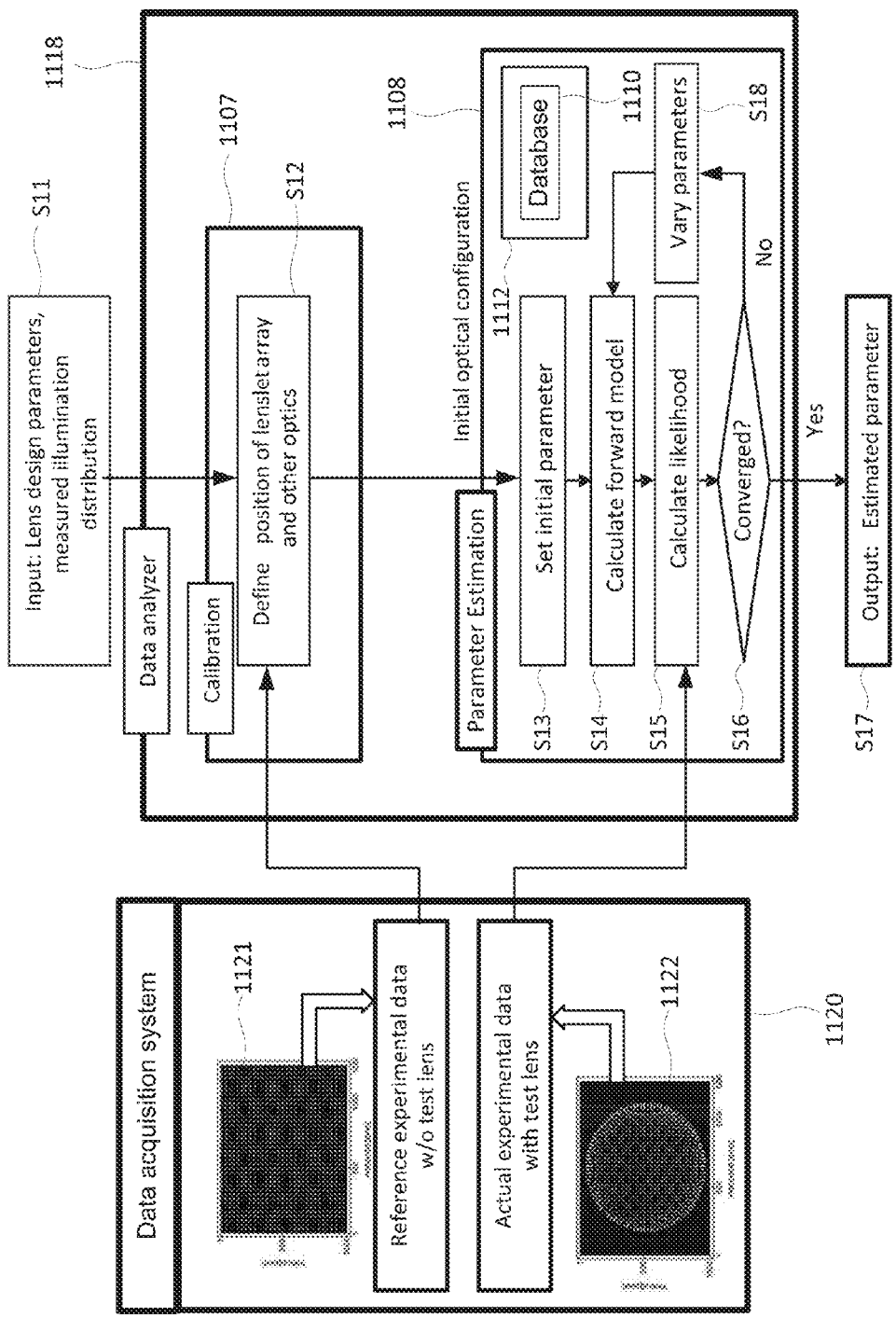
FIG. 14 illustrates a schematic diagram of the data analyzer.

FIG. 14 shows a schematic block diagram of the data analyzer 1118. The data analyzer 1118 can execute a wavefront estimation process including the steps S11 to S18, as set forth below. To that end, the data analyzer 1118 includes a calibration module 1107, a parameter estimation module 1108, and a database 1110 stored in a storage unit 1112 (memory), such as a hard disk drive or portable memory device. The data analyzer 1118 can be implemented as a generic programmable computer or a data processing unit (microprocessor), which can be specifically configured (programmed) to execute the process sequence of steps S11 to S18. The data analyzer 1118 and its constituent components (modules) thereof can also be implemented as individual hardware elements or distributed processing units. In the present embodiment, the data analyzer 1118 may be implemented as a programmable computer including a data processing unit, such as a central processing unit (CPU). Instead of a generic programmable computer or in addition thereto, the process sequence of steps S11 to S18 may be accomplished by other hardware devices, such as a dedicated microprocessor or a distributed network of computers.

During operation of the wavefront measurement apparatus of FIG. 13, the data analyzer 1118 performs a wavefront estimation process as illustrated in FIG. 14. At step S11, lenslet parameters and measured illumination distribution are input manually or automatically into the storage unit 1112. Lenslet parameters may include optical information such as focal length and pitch of the lenslet array 1104, the number of lenslets in the lenslet array, and so on. The measured illumination distribution may be obtained from the sensor array 1105 via a data acquisition system 1120, or may be provided from pre-stored measurements (e.g., latest measured illumination distribution) in the local storage unit 1112 or remote storage device (not shown). The input lenslet parameters and illumination distribution are then provided to the calibration module 1107. Some of the functions of the calibration module 1107 can be to obtain information about the position relationship between the lenslet array and the detector array, or to appropriately align (calibrate) the positions thereof. That is, as further described below, the calibration module 1107 may be used to interactively align the actual optical units, for example, via feedback circuits, as it is known in the art. In addition thereto, or instead of, the calibration module may also be used to obtain the position relation of the optical units as information (data) that can be used as input information for the estimation process. To that end, at step S12, the position of the lenslet array and of other optical elements are defined by using reference data that are obtained without the test element 1103, whereby the sensor array 1105 detects a substantially plane wave profile, as shown in the screenshot 1121. The data acquisition system 1120 provides the reference data to the calibration module 1107 of the data analyzer 1118. Thus, an initial optical configuration of the measuring apparatus including the position of the lenslet array is set at step S12. Once the initial optical configuration is set by the calibration module 1107 the flow process advances to the sequence steps performed in the parameter estimation module 1108.

Once the reference data have been acquired by the data analyzer 1118 and the initial optical configuration of the measuring apparatus has been established, the test element 1103 is positioned in the optical path between the light source and the wavefront sensor for measurement. That is, in FIG. 13, light emitted by the light source 1100 is directed towards the test element 1103, such that the wavefront of the light travels through the test optics and is detected by the sensor array 1105 of the wavefront sensor 1115. At step S13, initial parameters that describe the wavefront expected to be formed by the test element 1103 are set in the parameter estimation module 1108. Specifically, the initial parameters are set as Zernike coefficients that can be zero as the default value. In other words, at step S13, the parameter estimation module 1108 sets initial parameters that can be representative of a substantially plane wave (Zernike coefficients with zero value). At step S14, once steps S11 to S13 are completed, a forward model is calculated based on values received from at least one of steps S11 to S12 and the initial parameter set at step S13. That is, in step S14, based on the reference data (data obtained without test optics), the optical configuration of the measurement apparatus and data of the test optics, a forward propagation model is calculated based on the initial parameters set at step S13. As discussed in more detail below, a beamlet-based propagation model or a ray-based propagation model can be used as the forward propagation model. In terms of maximum likelihood estimation (refer to Eq. (1)), the forward propagation model calculated at step S14 may be considered as a vector of estimated model parameters.

Once the forward model (simulated data) has been established, the process advances to step S15. At step S15, the data acquisition system 1120 acquires actual experimental data from the sensor array 1105. Specifically, at step S15, actual experimental data are measured in the optical apparatus of FIG. 13 by using the test lens (test element 1103). In this manner, the sensor array 1105 detects a wavefront profile formed by the test element 1103, as shown in the screenshot 1122 of FIG. 11. The data acquisition system 1120 provides the actual experimental data (measured data) to the parameter estimation module 1108 of the data analyzer 1118. Accordingly, in terms of maximum likelihood estimation (refer to Eq. (1)), the measured data with the test element 1103 placed in the optical path may be considered as a vector of observations (vector of observed values).

At step S15, the data analyzer 1118 calculates the likelihood of the parameter using the actual experimental data (e.g., as shown in screenshot 1122 of the data acquisition system 1120) and simulated data, which are obtained by using the forward model at step S14. That is, at step S15, given the vector of observations (measured data), the objective is to find the vector of parameters in the forward model that has the highest probability (maximum likelihood) of generating (matching) the observed data. The value of the maximum likelihood of the parameter may indicate how small a difference between the actual experimental data and the simulated data can be made, that is indicating how closely the parameter and the forward model can model the actual optical system that generated the experimental data. Here, the likelihood can be based on estimation algorithms (discussed below with reference to FIGS. 22, 26 and 30 and Equations 16-19) that can determine whether the actual experimental data and the simulated data can converge (match).

Thus, at step S16, it is tested whether the actual experimental data (measured data) and the simulated data (forward model) have converged. That is, at step S16, it is tested whether the Zernike coefficients (parameters) of the forward model converge with like parameters that represent the measured wavefront profile. If, at step S16, the calculated result has converged, then the estimated parameters (parameters established by the forward model) are output at step S17. However, if it has not converged, the estimated parameters can be changed at step S18, and the process between steps S14 and S16 is iteratively repeated until the result has converged. Specifically, as used herein, the estimated parameters may be changed by iteratively changing the value of the Zernike coefficients until the forward model substantially converges with the measured data. For example, as discussed below with reference to Equations (16-19), the values of data g in the vector of parameters M obtained by the forward model are iteratively changed and tested for maximum likelihood to obtain a vector of observed values θ. The result can be considered converged when the difference between the actual experimental data and the simulated data, obtained by using the estimated parameters, is equal to or less than a threshold value. In this manner, by mathematically obtaining a difference between the initial Zernike coefficients (ideal wavefront) and the estimated Zernike coefficients that substantially converge (match) with the measured data (observed wavefront parameters), one can determine the wavefront aberrations caused by the optical element under test.

The calibration module 1107 of the data analyzer 1118 enables the analyzer to calibrate several optical parameters such as positions of optics, detector parameters, and illumination distribution. Specifically, once the lens parameters and measured illumination distribution are input at step S11, the calibration module 1107 calibrates the optical system via known electronics such that the desired parameters are established therein. For example, the calibration module 1107 may send electronic signals to power ON the light source 1100 with sufficient power to provide the desired illumination distribution at sensor array 1105. In addition, the calibration module 1107 may output electronic signals indicative of the desired positions of at least one of test element 1103, lenslet array 1104, or detector 1109. In response to calibration signals output from calibration module 1107, each of test element 1103, lenslet array 1104, or detector 1109 may be moved to (or aligned in) desired positions to obtain optimal illumination distribution at sensor array 1105.

Parameter estimation module 1108 performs an estimation function that estimates optical (wavefront) parameters which are of interest when the test element 1103 is present in the optical system. These parameters can include positions of each optical element including test element 1103, and wavefront deviation or intensity distribution on the specific plane or sphere surface of the test element 1103.

The flow process of FIG. 14 can be modified to take advantage of data stored in database 1110, as follows. Specifically, after setting the initial parameters at step S13, the data analyzer 1118 (based on the initial parameters) may search the database 1110 to determine if data concerning a previously established forward model exist in the database. When useful data indicative of a previously established forward model exist in the database 1110, the data will be used to calculate the likelihood at step S15. On the other hand, if there are no data in the database 1110, the forward model is calculated at step S14 as described above, and the calculated result can be stored in database 1110.

This database 1110 can store multiple forward model output data which are calculated previously. These forward model output data are stored with calculation parameters defined in the forward model, then this database is indexed. When same or similar test optics (test elements) are measured by the wavefront measuring apparatus, the parameter estimation process in the data analyzer searches for data calculated with similar parameters in the indexed database. If similar data are found in the database 1110, such data are used for the calculation of likelihood (at step S15). If not, a new forward model is calculated based on the optical element under test; then the calculated data are stored in the database. During repeated measurements of similar test optics, the necessary number of forward calculations can be reduced because the database 1110 can store data which has already been calculated with similar parameters.

In other words, processing time can become shorter during repeated measurement. Therefore, processing in the wavefront measurement apparatus can be accelerated. This acceleration of likelihood calculation can realize a larger number of iterations in shorter time.

As described above, a forward model calculation can be used in MLE for this measurement system. To calculate the forward model, the data analyzer uses the output signal from the optical detector, and for this purpose, an optical propagation calculation is executed.

For example, BSP (Beam Synthesis Propagation) in CODE V®, which is a commercial software package developed by Optical Research Associates, may be used to implement a forward propagation model. BSP is based on the beamlet-based propagation method. This beamlet-based method can overcome several limitations of fast-Fourier-transform (FFT)-based propagation models.

Figure 15:
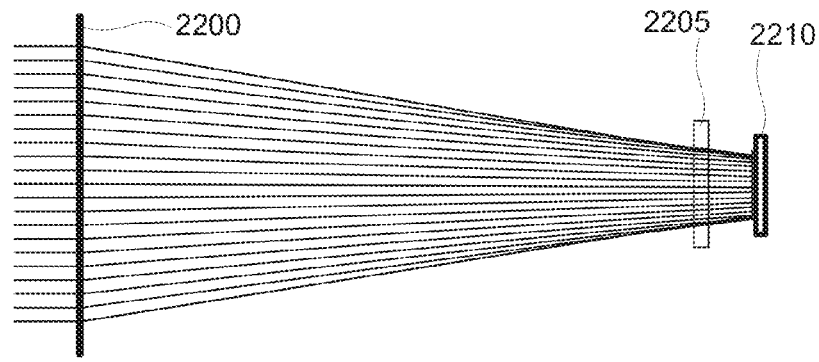
FIG. 15 illustrates an optical configuration.
Figure 16:
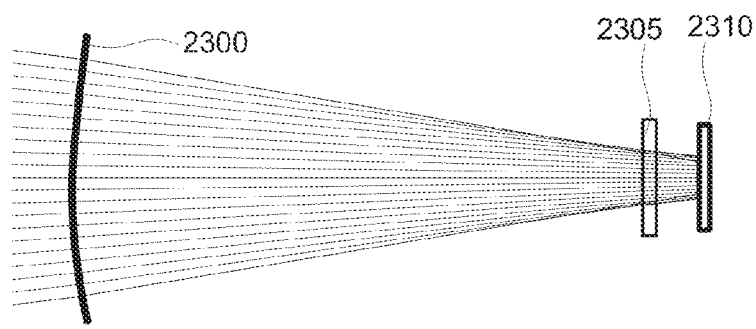
FIG. 16 illustrates an optical configuration.

As examples of the forward model configuration, the optical configurations are illustrated in FIGS. 15 and 16. FIG. 15 illustrates the optical configuration for forward propagation with the exit pupil plane 2200, and FIG. 16 illustrates the optical configuration for the forward model with exit pupil sphere 2300. The lenslet array is denoted by 2205 and 2305, and the optical detector, such as a CCD image sensor, is denoted by 2210 and 2310, respectively.

The wavefront or complex amplitude distribution is defined on the exit pupil plane 2200 or sphere 2300. Rays at the exit pupil plane 2200 or sphere 2300 are traced from a non-illustrated light source to the CCD image sensor plane (also referred to as image plane IP). Location and direction of rays are calculated on the basis of wavefront characteristics at the pupil and other optical design parameters of the optical element under test.

In the beamlet-based propagation, each ray has a small beamlet such as a Gaussian beam. A number of beamlets are superposed on the image sensor plane, then the intensity profile on the image plane can be calculated. The data analyzer can perform estimation of the optical parameters of interest of the optical system, or components thereof with a simple optical system. Therefore, the present embodiment can achieve measurement of highly aberrated wavefronts that cannot be measured by conventional measurement technology. As a result, verification of optical performance of lens, lens unit or optical components can be realized with a simple optical configuration.

In the case where the wavefront has very large deviation on the pupil, a larger number of beamlets is necessary for representation of this deviation. The number of beamlets is limited by computational resources, so accuracy of beamlet-based propagation decreases rapidly if the amount of wavefront deviation exceeds a certain level.

Figure 17:
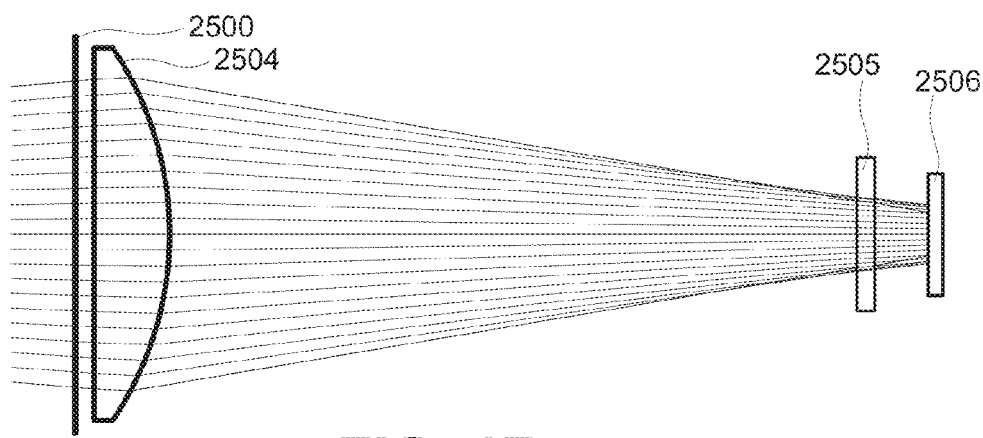
FIG. 17 illustrates an optical configuration.

FIG. 17 illustrates a ray-trace diagram of the forward model. In FIG. 17, in order from the light source side to the wavefront sensor side, light rays travel through a test element 2504 and a lenslet array 2505 to be detected by a CCD sensor array 2506. A predetermined plane 2500 is established at a position immediately adjacent to the test element 2504 on the light source side thereof, and lens design data (test element parameters) are assumed to be known beforehand. When lens design data for the test element are defined in this model, wavefront deviation at the predetermined plane 2500 can be estimated in a much simpler manner than when the predetermined plane is established without knowledge of the lens design data. Based on the premise that lens design data and a predetermined plane have been established, a forward propagation model is calculated. Using this forward model, wavefront deviation or optimized lens design parameters are estimated in the data analyzer. Wavefront aberration can then be corrected using these estimated results.

Figure 18:
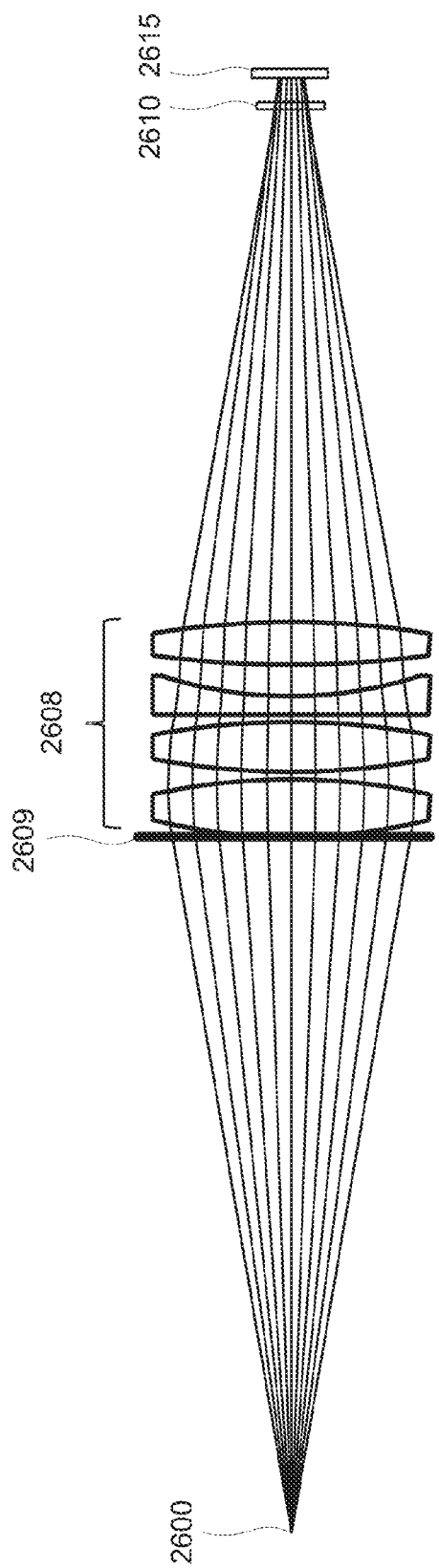
FIG. 18 illustrates an optical configuration.

Furthermore, any optical parameters of interest can be also estimated by extrapolating (projecting) measured parameters to a plane of interest. FIG. 18 illustrates the optical configuration of measurement for a lens unit (group of lenses) 2608. In this case, optical parameters such as surface profile, lens thickness, distance between lenses, decenter, tilt or refractive-index distribution can be the target parameters to be estimated in the data analyzer.

As an example, one can consider a wavefront measurement of the lens unit 2608 as shown in FIG. 18. For convenience, wavefront deviation is represented with fringe Zernike polynomials as shown in TABLE 1, but other functions may be used. The parameters to be estimated in the data analyzer are coefficients of these polynomials. The initial parameters of the wavefront are first defined at a predetermined plane 2609, on the light source side of the lens unit 2608 (test optics or test element) in FIG. 18. A lenslet array 2610 and sensor array 2615 arranged to form a SHWFS is used to detect light passing through the lens unit 2608. Since the initial lens design data and predetermined plane are known beforehand, parameters of interest in the lens unit 2608 can be estimated by forward propagating the initial wavefront parameters from the predetermined plane 2609 to the plane (surface) of interest.

TABLE 1: Zernike polynomials defined at the predetermined plane 2609 of FIG. 18 and forward propagated to plane or surface of interest.

| Term number | Zernike function term |
|---|---|
| 1: | 1 |
| 2: | $r \cos \theta$ |
| 3: | $r \sin \theta$ |
| 4: | $2r^2 - 1$ |
| 5: | $r^2 \cos 2\theta$ |
| 6: | $r^2 \sin 2\theta$ |
| 7: | $(3r^3 - 2r)\cos \theta$ |
| 8: | $(3r^3 - 2r)\sin \theta$ |
| 9: | $6r^4 - 6r^2 + 1$ |
| 10: | $r^3 \cos 3\theta$ |
| 11: | $r^3 \sin 3\theta$ |
| 12: | $(4r^4 - 3r^2)\cos 2\theta$ |
| 13: | $(4r^4 - 3r^2)\sin 2\theta$ |
| 14: | $(10r^5 - 12r^3 + 3r)\cos \theta$ |
| 15: | $(10r^5 - 12r^3 + 3r)\sin \theta$ |
| 16: | $20r^6 - 30r^4 + 12r^2 - 1$ |

Figure 19:
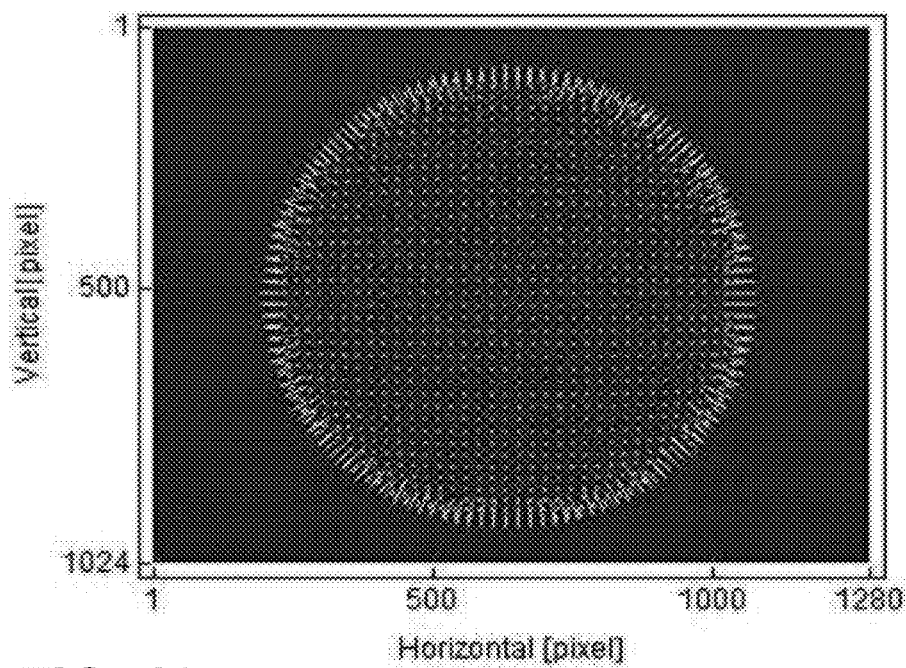
FIG. 19 illustrates an example of simulated detector data.

Initially, in order to initiate the process of estimating a wavefront parameter at a desired plane, information indicative of lens design parameters and detector data are input according to step S11 of FIG. 14. In terms of detector data, specific data of the detector itself, for example, the number of CCD image sensor pixels (e.g., 1280×1024), PSNR (Peak Signal to Noise Ratio)=400, and digitization resolution is 8 bit for the AD converter can be entered. More importantly, specific measured illumination distribution, as received at the detector array may be entered. FIG. 19 shows an example of detector data obtained from an optical system arranged in the manner shown in FIG. 18. Detector data are passed to data analyzer 1118.

The data analyzer 1118 in FIG. 14 has a calibration function and a parameter estimation function. The calibration function calibrates several optical parameters such as positions of optics, detector parameters, illumination distribution, and the like.

The parameter estimation function estimates optical parameters, such as wavefront aberration to determine surface morphology or wavefront deviation, which are typical parameters of interest. In the example of FIG. 18, wavefront parameters can be first estimated at the predetermined plane 2609 based on the known lens design data. However, by using wavefront propagation, one can estimate any parameter corresponding to the position or morphology of each optical element included in a test element 2608, by estimating wavefront deviation or intensity distribution on the specific plane or sphere of interest.

As described above, a probability distribution function (PDF) is denoted by $pr(g|\theta)$, where g is the observed data vector, which is characterized as an M×1 vector, and $\theta$ is the parameter vector, which is characterized as a P×1 vector. The likelihood of $\theta$ given g is defined by Eq. (1), and the maximum-likelihood (ML) estimate of $\theta$ given g is defined by Eq. (2), as described above.

In practical cases, it is not usually possible to obtain ML estimates analytically, so ML estimates must be sought numerically.

For example, if the probability distribution function (PDF) of $\theta$ given g is defined by a Gaussian distribution, the likelihood is given by Eq. (16)

$$L(\theta | g) = pr(g | \theta) \qquad (16)$$

$$= \prod_{m=1}^{M} \frac{1}{\sqrt{2\pi\sigma^2}} \exp\left\{-\frac{[g_m - \bar{g}_m(\theta)]^2}{2\sigma^2}\right\}$$

where g is the parameter data, m an index of the vector M, $\bar{g}$ is the mean of the parameter data, which is calculated with the forward model, and $\sigma^2$ is the variance due to noise. Accordingly, the log-likelihood can be written as:

$$\ln L(\theta | g) = -\frac{1}{2} M \ln(2\pi\sigma^2) - \frac{1}{2\sigma^2} \sum_{m=1}^{M} [g_m - \bar{g}_m(\theta)]^2 \qquad (17)$$

As a result, the ML estimate can be written as $$\hat{\theta}_{ML} = \arg\min \sum_{m=1}^{M} [g_m - \bar{g}_m(\theta)]^2. \qquad (18)$$

In the parameter estimation process shown in FIG. 14, the ML estimate is calculated iteratively. To that end, mean data $\bar{g}$ is necessary for calculation of the likelihood at a test location. Data $\bar{g}$ is calculated in the "calculate forward model" step of the process, then the log-likelihood ln L($\theta|g$) is calculated in "Calculate likelihood" step of the process. The ML estimate $\hat{\theta}_{ML}$ is sought by optimization search methods. Thus, to optimize the search, a cost function is assigned to each value of the parameters calculated in the forward model, as defined by Eq. (19), $$\text{cost function} = \sum_{m=1}^{M} [g_m - \bar{g}_m(\theta)]^2. \qquad (19)$$

Equation (18) means that $\hat{\theta}_{ML}$ is the $\theta$ which has minimum value of the cost function.

Accordingly, $\hat{\theta}_{ML}$ is searched for within a cost function profile (or surface or hypersurface depending on the number of parameters) over a search area A.

Figure 20:
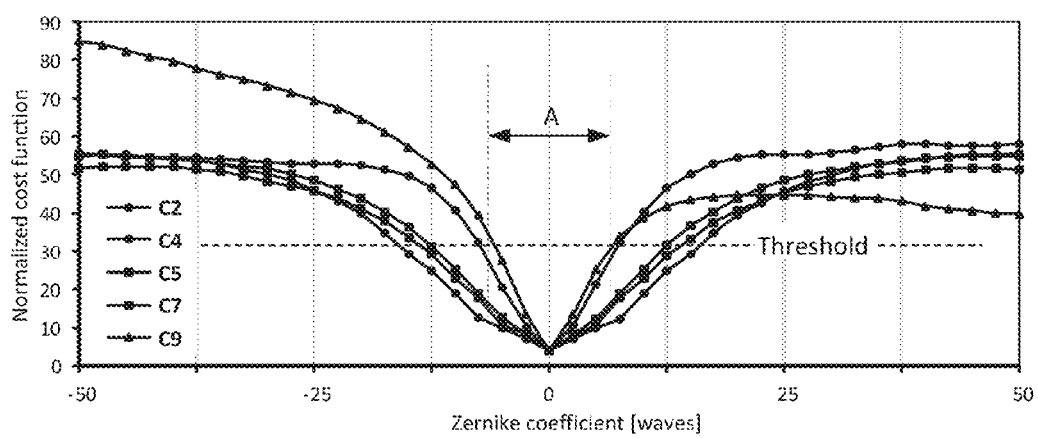
FIG. 20 illustrates a change of cost function with respect to Zernike coefficients.

FIG. 20 shows an exemplary cost function of Zernike coefficients. In FIG. 20, C2 indicates the coefficients of $2^{nd}$ Zernike polynomial in TABLE 1. In this case, an ideal surface at the predetermined plane has no wavefront deviation, so an optimum value becomes 0. In the optimization process, the analyzer searches for these optimum coefficients on the profile of the cost function surface. For example, when the parameter C2 is calculated, other parameters can be fixed at specified values.

Figure 21A:
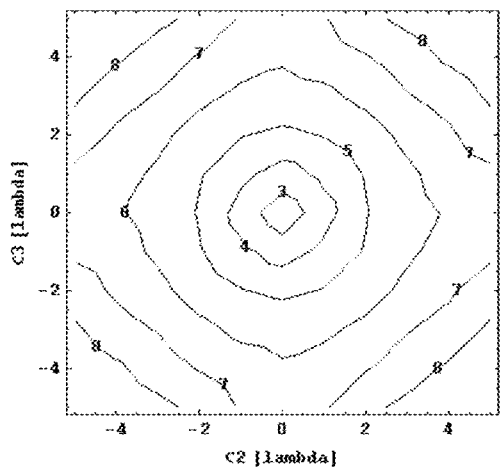
FIGS. 21A to 21J illustrate two-dimensional cost function surfaces of the combination of various parameters.
Figure 21B:
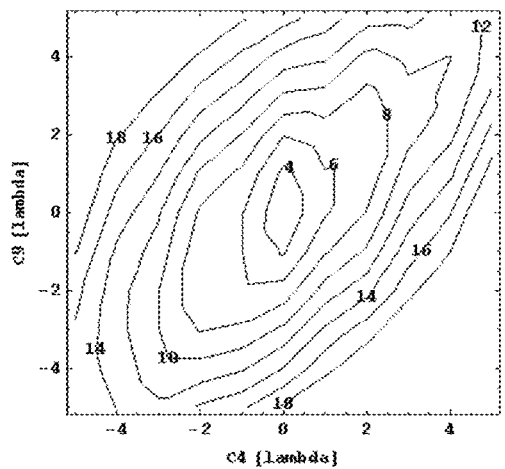
Figure 21C:
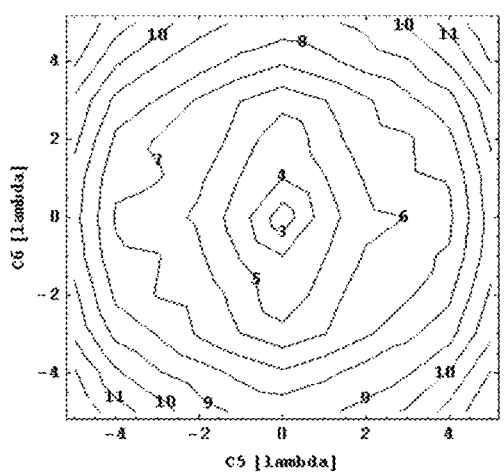
Figure 21D:
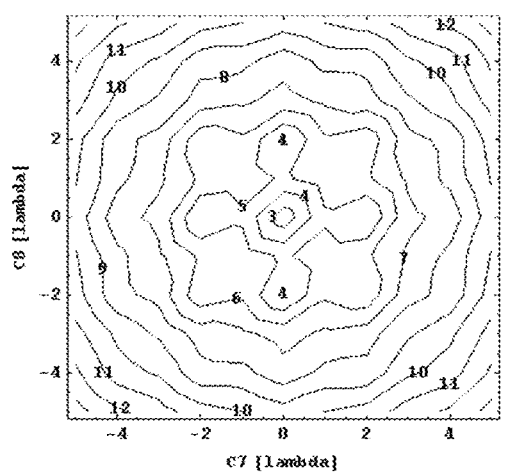
Figure 21E:
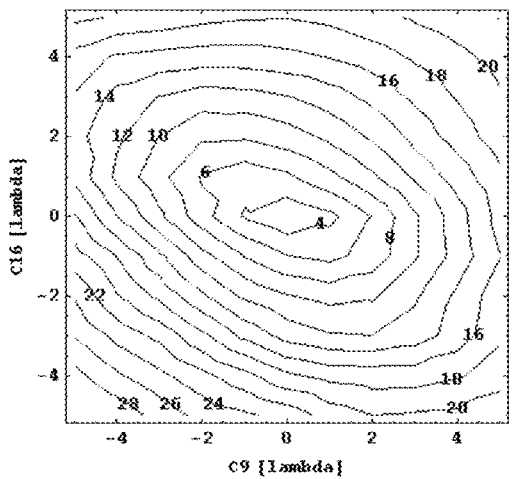
Figure 21F:
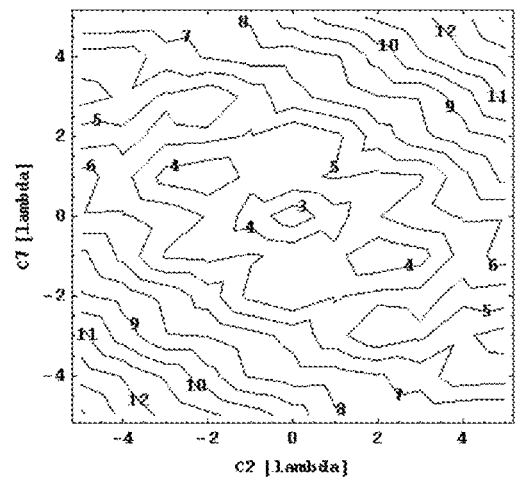
Figure 21G:
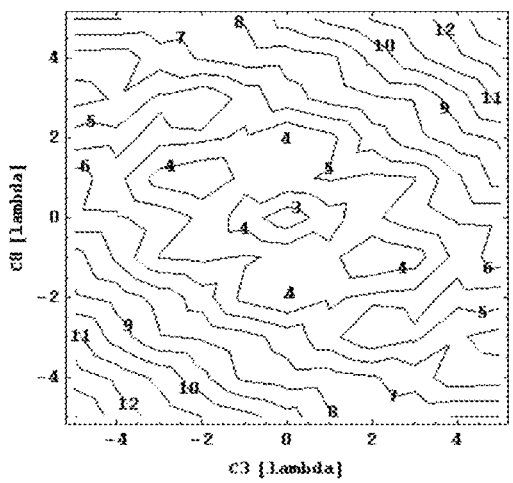
Figure 21H:
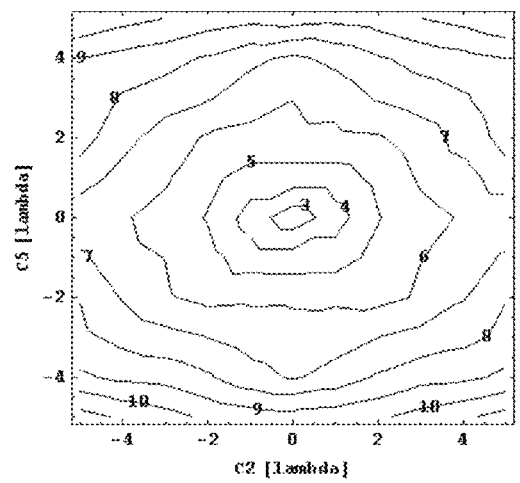
Figure 21I:
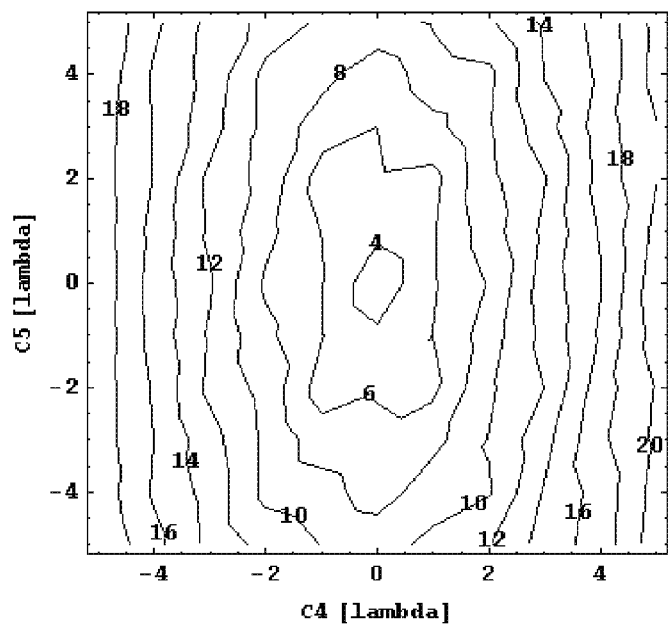
Figure 21J:
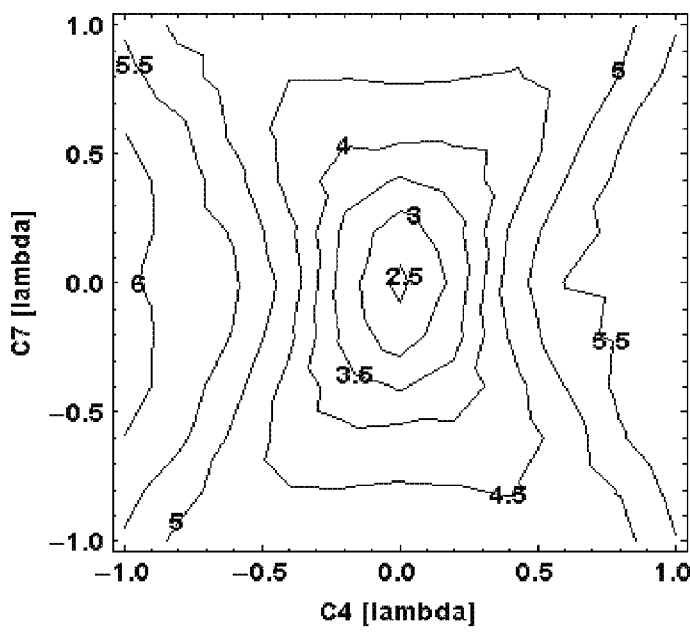

FIGS. 21A to 21J show two-dimensional cost-function surfaces of the combination of various parameters (Cn means the coefficient of the n-th Zernike polynomial). The inventors herein have found that cost functions of {C4, C9} illustrated in FIG. 21B, {C2, C7} illustrated in FIG. 21F and {C3, C8} illustrated in FIG. 21G are highly correlated (i.e., Cn axisymmetric case). Therefore, these combinations must be estimated simultaneously.

In the other words, a search of these optimum parameters on the cost-function surface of these combinations is performed. Using the cost function of these combinations, one can reduce the number of forward model calculations; and thus, efficient MLE can be realized.

For the investigation of symmetry of cost function surface to find correlated parameters, the following procedure can be used:

(1) Decide an area A for the investigation of symmetry: In FIGS. 21A to 21J, the area A is defined as width of coefficients which has smaller cost function than a certain threshold.

(2) Investigate symmetry of the cost function surface in the area A: Symmetry can be investigated using cost function surfaces as shown in FIGS. 21A to 21J.

(3) Decide parameter (coefficient) combinations to be optimized simultaneously: In FIGS. 21A to 21J, these combinations can be decided as {C4, C9}, {C2, C7}, {C3, C8} and {C9, C16}. Parameter combinations to be optimized simultaneously can be decided (determined) based on symmetry established under procedure (2), above.

(4) After that, optimization is performed in the data analyzer.

(5) If optimization is not well converged, step (1) is repeated using the most recent output parameters of step (4).

Figure 22:
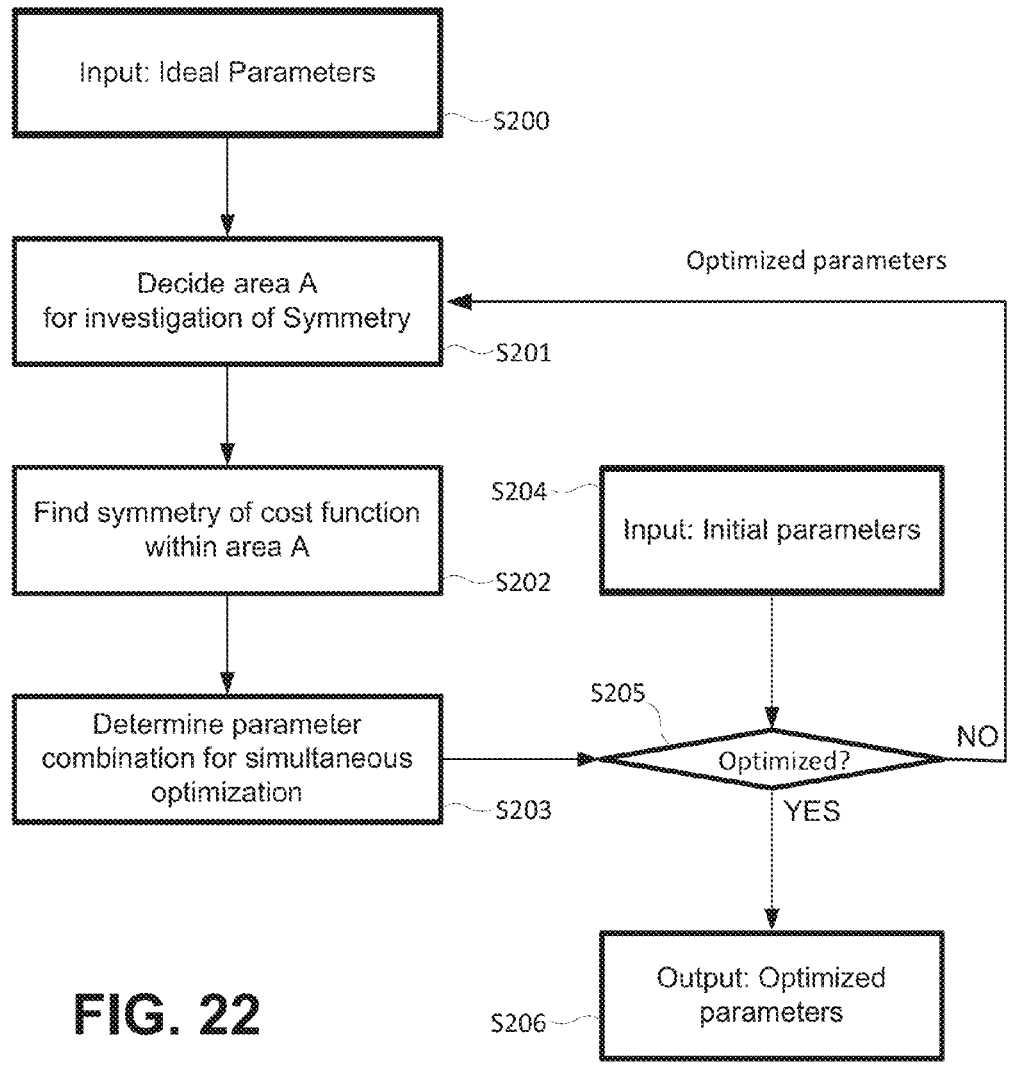
FIG. 22 illustrates a flow chart for an optimization procedure.
Figure 25A:
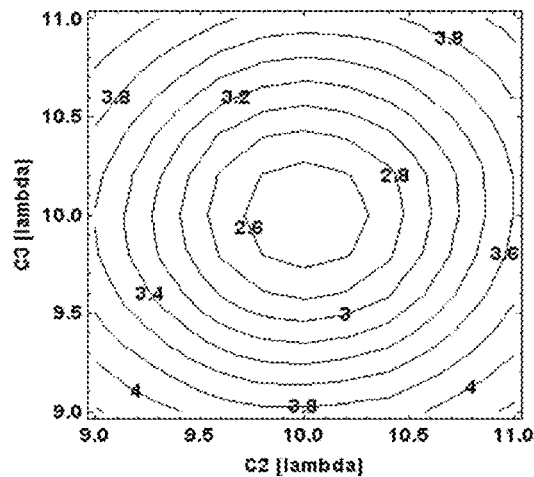
FIGS. 25A to 25J illustrate two-dimensional cost function surfaces of the combination of various parameters of an exemplary wavefront.
Figure 25B:
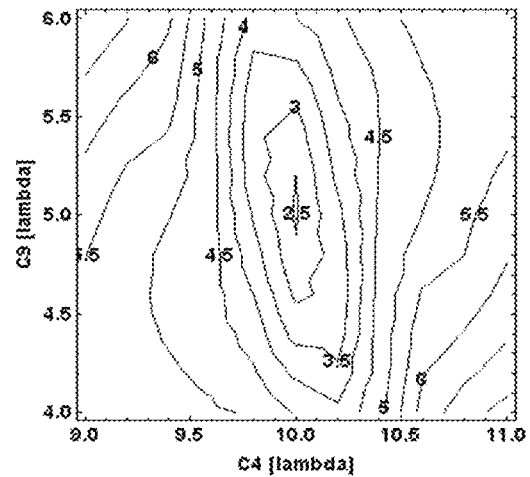
Figure 25C:
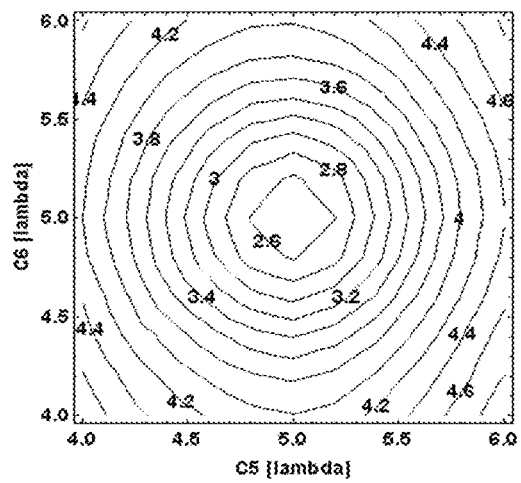
Figure 25D:
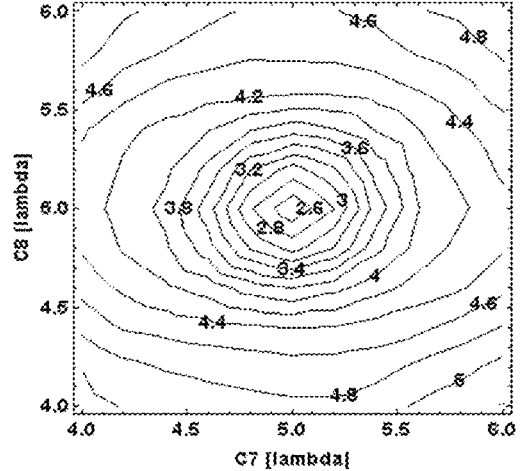
Figure 25E:
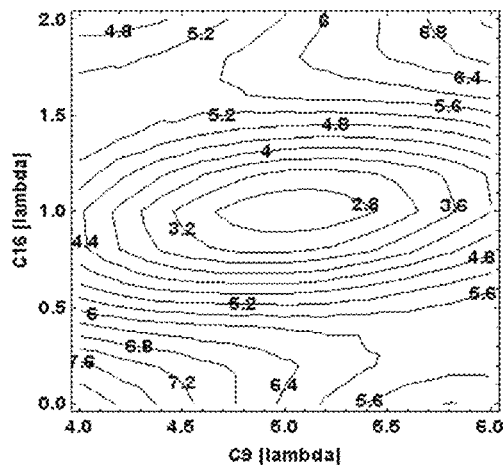
Figure 25F:
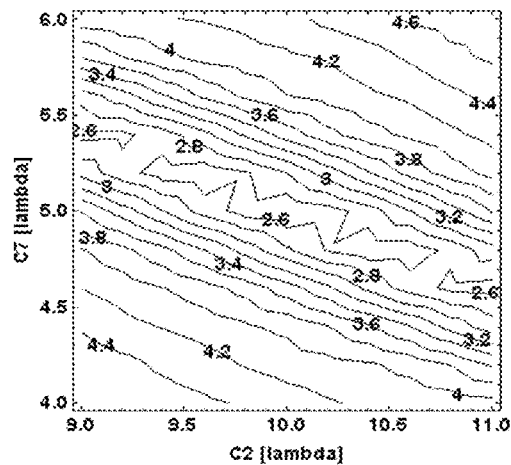
Figure 25G:
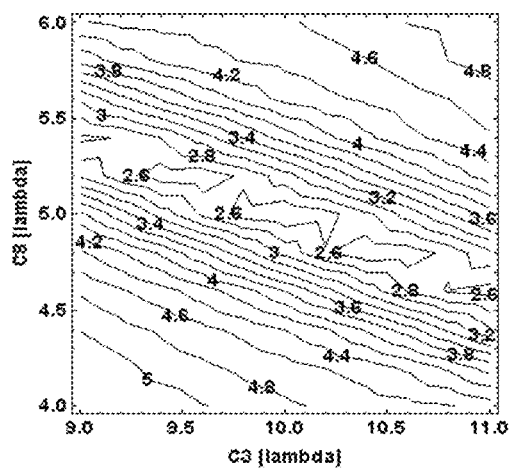
Figure 25H:
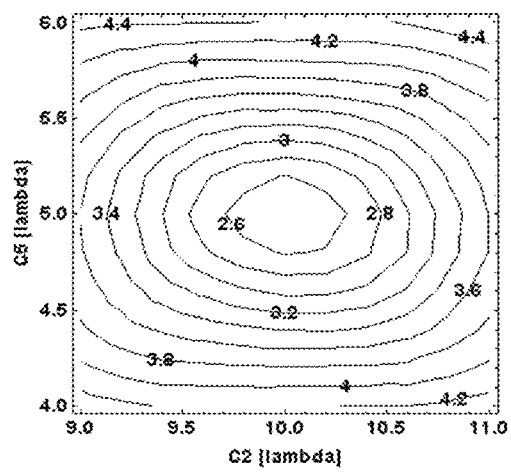
Figure 25I:
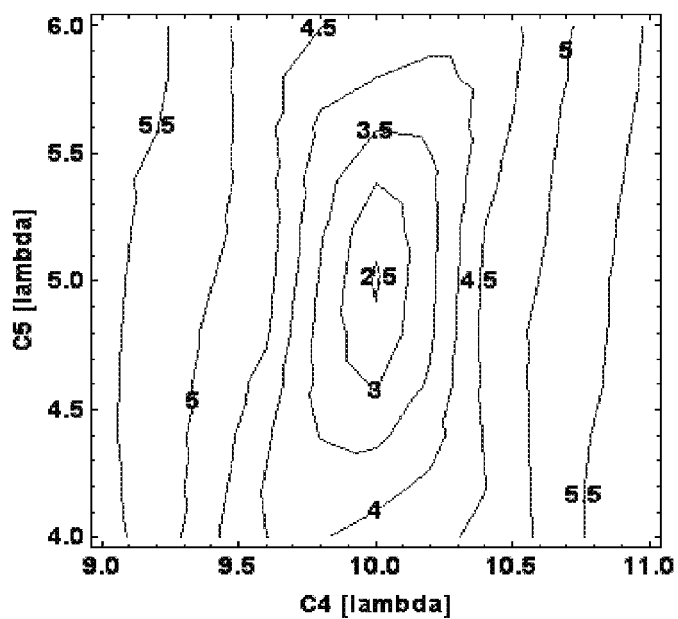
Figure 25J:
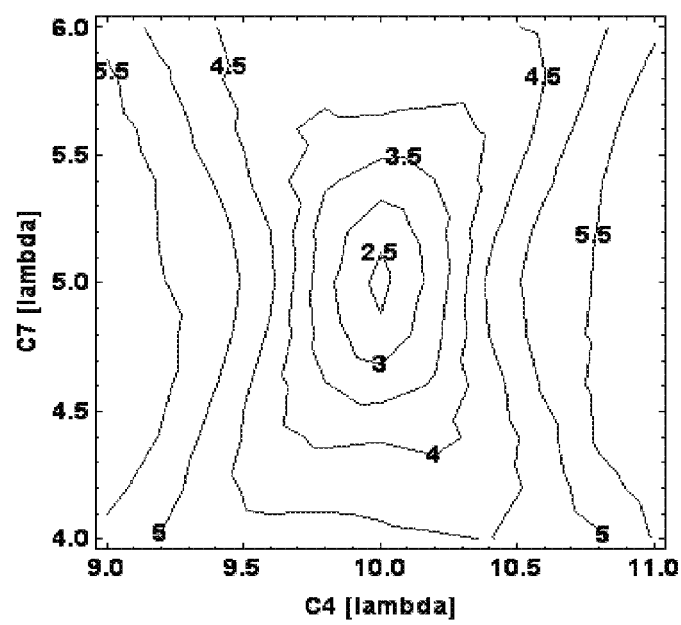

FIG. 22 shows an exemplary flowchart for the process of investigating symmetry of the cost function surface. At step S200, ideal parameters at the predetermined plane are set. In short, for an ideal (plane) wavefront, Zernike coefficients can be set to zero at the predetermined plane, for example, as in the case of the forward model illustrated in FIG. 17. Ideal parameters at the predetermined plane may also be sent in function of an ideal spherical wavefront, for example, as illustrated in FIG. 16. That is, ideal values are design values of the optical configuration used for the forward model. An area A, which is illustrated in FIG. 20 and analyzed in FIGS. 21A-21J, for the investigation of symmetry, is determined (decided) at step S201. The symmetry of the cost function surface within the area A is then investigated at step S202. A combination of parameters to be optimized simultaneously is determined (decided) at step S203 based on the investigated symmetry. And then, optimization will be executed at step S205 by using actual design parameters which are input as initial values at step S204. Theoretically, any initial parameters are acceptable, but in practice, actual design values (e.g., defined by Zernike coefficients at the predetermined plane) are used for initial parameters. In addition, if other parameters such as previous measured data are available, such previous data may also be used as initial parameters at S204 of FIG. 22. Finally, the optimized parameters, based on the cost function, are output at step S206. When parameters are not well optimized (NO in S205), the number of parameters for simultaneous optimization may be increased at steps S201-S203.

In the procedure (2) corresponding to the step S202 of FIG. 22, several methods can be used for investigation of cost function symmetry, that is the degree of correlation between parameters to be optimized. For example, as few as nine points of cost function can be used for this investigation.

FIGS. 23A-B and 24A-B illustrate a simplified method of investigating the cost-function symmetry of exemplary parameters to be optimized. FIGS. 23A and 23B show a symmetric case where the parameters can be searched over independently in a cost function minimization process. The nine points of the cost function at P11, P12, P13, P21, P22, P23, P31, P32, and P33 are defined as shown in FIG. 23A. Based on the position of each point within area A, a cost value Lxx corresponding to the position of the point Pxx can be assigned to the cost function, so that in FIG. 23B L22<L32<L12, L21<L31<L11 and L23<L33<L13. Then sets of 3 values of cost function can be curve fit to parabolic functions as shown in FIG. 23B. The minima of the three curve fit parabolic functions occur at almost the same value for parameter a1, which is denoted by a dotted line. Accordingly, when the three parabolic functions have a substantially similar axis location and orientation, and values of the cost function can be sorted from minimum to maximum in ascending order, the parameters of the cost function can be said to be symmetric and can be optimized independently.

On the other hand, FIGS. 24A and 24B show an asymmetric case. In FIG. 24B, the three minima of the parabolic functions occur at different locations along a1. In addition, the values of the cost function based on the position of each point within area A yields L22<L32<L12, LL11<L21<L31, and L33<L23<L13. In the asymmetric case, the cost function cannot be sorted from minimum to maximum in ascending order. Thus, finding the overall minimum value of the cost function requires optimizing both parameters a1 and a3 together. Accordingly, it can be safely said that this cost function is asymmetric within the predetermined area A. These criteria (rank ordering of cost function values) are not enough to draw a conclusion of symmetric (uncorrelated) or asymmetric (correlated). Although, the common location of the minima alone may be enough to ensure that the parameters can be searched independently, a combination of rank ordering and the location of the minima can ensure appropriate determination of symmetry of lack thereof.

When the predetermined plane has a certain amount of wavefront deviation, the Zernike coefficients of a wavefront at the predetermined plane can be tabulated as shown in TABLE 2. In this case, cost function surfaces become as shown in FIGS. 25A to 25J.

TABLE 2

Zernike coefficients of aberrated wavefront at predetermined plane

|  | Target wavefront coefficient [waves] |
|---|---|
| C2 | 10 |
| C3 | 10 |
| C4 | 10 |
| C5 | 5 |
| C6 | 5 |
| C7 | 5 |
| C8 | 5 |
| C9 | 5 |
| C16 | 1 |

The surface profiles of the cost function in FIGS. 25A to 25J are different from those illustrated in FIGS. 21A to 21J, due to the different true values of the parameters (Zernike coefficients). Specifically, cost functions of {C4, C5} in FIG. 25I and {C4, C7} in FIG. 25J indicate more correlation as compared to cost functions of similar parameters illustrated in FIG. 21I and FIG. 21J, respectively. According to the symmetry of Zernike polynomials, {C4, C6} and {C4, C8} could also be correlated. Therefore, if convergence is not achieved with a low number of Zernike coefficients, it might be necessary to add the combinations of {C4, C5}, {C4, C6}, {C4, C7}, and {C4, C8}.

As described above, the combinations, which must be optimized simultaneously are {C4, C9}, {C2, C7}, {C3, C8} and {C9, C16}. In addition, the following combinations, ({C4, C5}, {C4, C6}, {C4, C7}, and {C4, C8}) can be added. As a result, combinations of {C2, C4, C7}, {C3, C4, C8} or {C4, C9, C16} also could work for more efficient convergence. In the beginning of the optimization, the detector data such as shown in FIG. 19 might be different from the forward model result because of magnification and position. In this case, tip, tilt and focus components need to be optimized in advance.

Tip, tilt and focus correspond to {C2, C3, C4}. Accordingly, the Zernike coefficients in this case can be estimated using the procedure shown in the flowchart of FIG. 26. In FIG. 26, at step S2300, an initial value for each parameter is set. At step S2301, coefficients C2, C3, and C4 of Zernike polynomials are estimated as a $1^{st}$ round of the contracting-grid global search. {C5, C6}, {C2, C7}, {C3, C8}, and {C4, C9, C16} are estimated at steps S2302, S2303, S2304, and S2305, respectively, still during the $1^{st}$ round of the contracting-grid global search.

After the $1^{st}$ round of the contracting-grid global search, a $2^{nd}$ to $6^{th}$ round of the contracting-grid local search can be executed, successively. {C2, C3}, {C4, C9}, {C5, C6}, {C2, C7}, {C3, C8}, and {C9, C16} are estimated at steps S2306, S2307, S2308, S2309, S2310, and S2311, respectively. At step S2312, a determination is made as to whether a desired number of iterations N has been completed. When the number of iterations has not been completed the contracting-grid local search is repeated. When the number of iterations has been completed the values with the highest likelihood are output at step S2313 as the estimated result.

Figure 27:
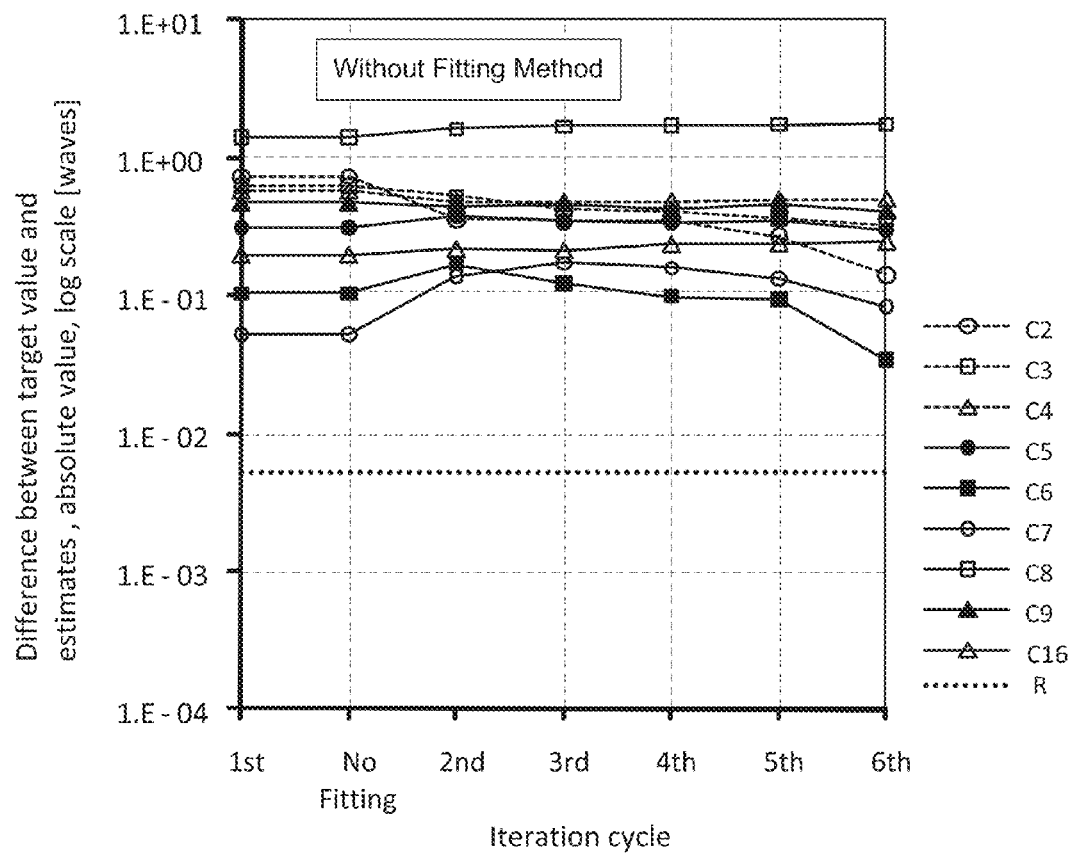
FIG. 27 illustrates a difference between estimated Zernike coefficients and a target value used for a maximum likelihood (ML) estimation process.

As a test of convergence, FIG. 27 shows the difference between estimated Zernike coefficients and known target values during ML estimation. Target value means the design coefficients tabulated in TABLE 2. Data of FIG. 27 are obtained as follows. First, simulated data of light distribution (such as FIG. 19) can be obtained by using the target values (Zernike coefficients in Table 2) input into the forward model. Second, the Zernike coefficients can be estimated based on the simulated data under the ML estimation. Finally, the difference between estimated Zernike coefficients and target value can be obtained.

After optimization, if there is a discrepancy between optimized (estimated) coefficients and target coefficients, the following process can be used.

FIG. 28 shows the cost function surface of the combination of {C7, C8}. Target coefficients are {5.0λ, 5.0λ}, however optimized values are {5.0834λ, 3.2395λ}. Thus it is seen that the search on the cost function surface has converged in a local minimum. Specifically, the inventors herein have found that the search may erroneously converge in local minima near the global minimum in the case of large aberration.

FIG. 29A shows the cost function surface of the combination of (C3, C8) after global optimization using the contracting-grid search described above. In this case, the search point may converge towards local minima that are different from true target values. To improve accuracy, the inventors herein have developed a further improvement to the contracting-grid search method. Specifically:

(1) Fit, using for example a least squares method, a simple quadratic function as defined by Eq. (20) below to discrete samples of the cost function $$f(x,y)=a_1x^2+a_2y^2+a_3xy+a_4x+a_5y+a_6 \qquad (20)$$

(2) Find the location which has minimum value of the quadratic function and use the location with the minimum value as the new center for the next iteration of the contracting grid search. By this method, improved convergence toward the global minimum has been demonstrated.

FIG. 29A shows discrete data of {C3, C8} likelihood, then FIG. 29B shows a fitted surface of {C3, C8} space. In this case, values of {C3, C8}={9.89978λ, 4.64926λ} were obtained as optimum coefficients from the fitted surface. Using this method, the optimization procedure shown in FIG. 27 has been substantially improved.

FIG. 30 illustrates a modified flow process for the contracting-grid search algorithm. Specifically, FIG. 30 shows the improved optimization process for the estimation of Zernike coefficients using the fitting method. In the improved optimization, the fitting process is executed between the $1^{st}$ round of the contracting-grid global search (steps S2701 to S2705) and the $2^{nd}$ to $6^{th}$ rounds of the contracting-grid local search (steps S2710 to S2715). After the initial value is set at step S2700, contracting-grid global searches over parameter combinations {C2, C3, C4}, {C5, C6}, {C2, C7}, {C3, C8}, and {C4, C9, C16} are executed at steps S2701 through S2705.

The fitting process for {C2, C7}, {C3, C8}, {C4, C9}, and {C5, C6} are executed at steps S2706 through S2709. After the fitting process, contracting-grid searches over parameter combinations {C2, C3}, {C4, C9}, {C5, C6}, {C2, C7}, {C3, C8}, and {C9, C16} are executed at steps S2710 through S2715. At step S2716, a determination is made as to whether a desired number of iterations N has been completed. When the number of iterations has not been completed the contracting-grid local search is repeated. When the number of iterations has been completed, the estimated values are output at step S2716. This improved process described in FIG. 30 can be applied to the first embodiment above within the back-propagation calculation.

Figure 31:
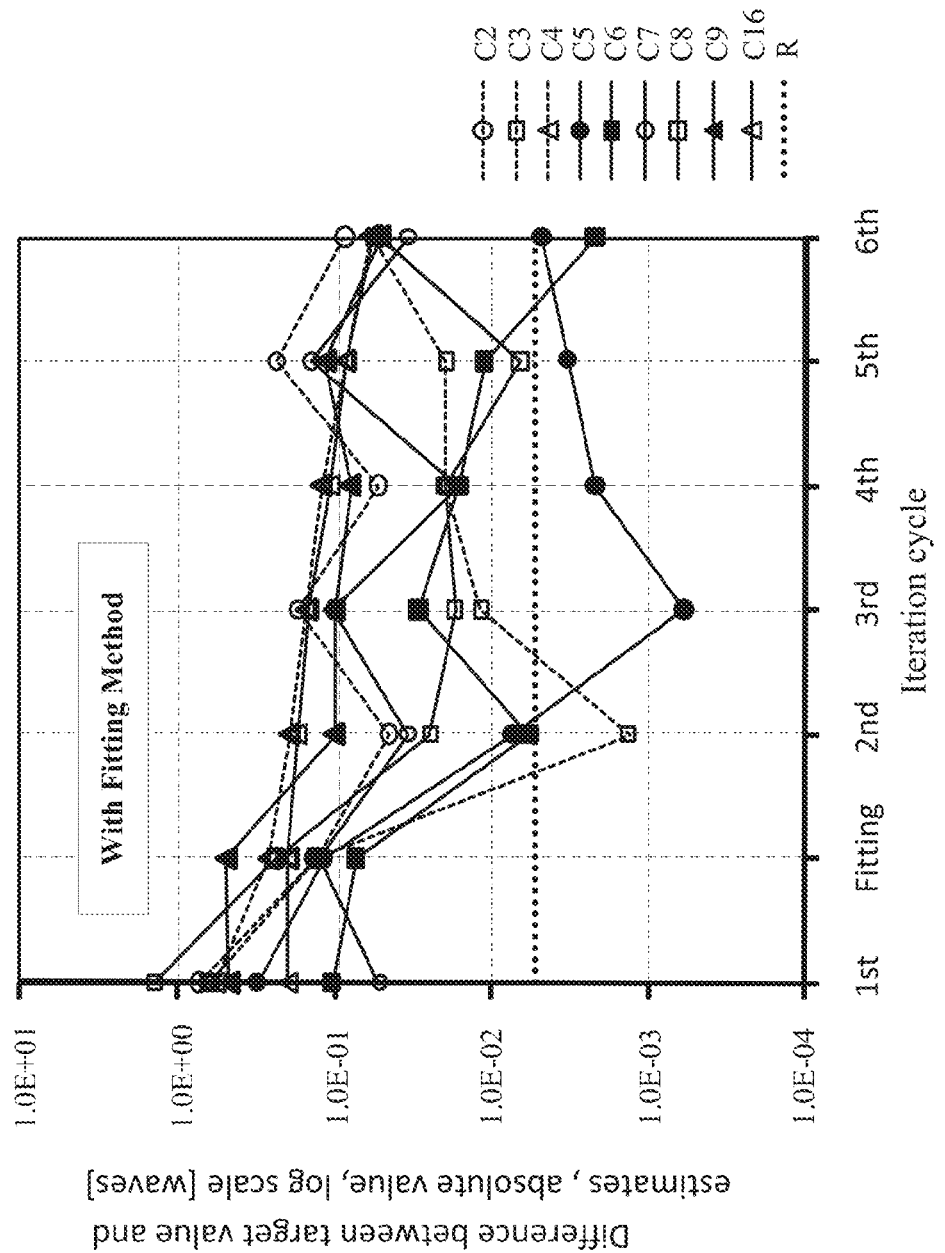
FIG. 31 illustrates a difference between estimated Zernike coefficients and target coefficients during the ML estimation using the fitting method.

The differences between estimated Zernike coefficients and target coefficients during the ML estimation using the fitting method are shown in FIG. 31. From this result, differences between target coefficients and estimated ones can become less than 0.1λ. Therefore, the inventors herein have confirmed that the contracting-grid search with fitting method can improve convergence performance dramatically.

The reduction in computational time for the optimization, and the improved accuracy of estimation results, as described herein, can advantageously lead to improved wavefront measurement techniques without departing from the principles described.

The concepts of the first and second embodiments can be applicable to processing data obtained from multiple detectors or arrays thereof. Data obtained from multiple detectors can be acquired with different detector positions, illumination modes, polarization states, or test element positions.

At least one embodiment of the present invention can achieve a measurement of a highly aberrated wavefront that cannot be measured by conventional measurement technology. Accordingly, testing or verification of optical performance of test elements, such as a single lens or a lens unit can be realized with a simple optical configuration.

In the first embodiment, the corrective element can compensate for some large low-order wavefront aberrations caused by the test element. In the second embodiment, the fitting method of the contracting-grid search can ensure that convergence of an estimated value is efficiently and accurately calculated.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method for estimating a wavefront whose deviation is represented with Zernike polynomials or another set of functions by using maximum likelihood estimation, the method comprising:
   preparing data obtained by using a wavefront sensor including a lenslet array and a detector;
   selecting an area of values of Zernike polynomial coefficients or values of coefficients of the another set of functions for executing an investigation of symmetry of a cost function surface of the Zernike polynomial coefficients or the coefficients of the another set of functions;
   executing the investigation of the symmetry of the cost function surface in the area selected in the selecting step;
   selecting a combination of the Zernike polynomial coefficients or coefficients of the another set of functions to be optimized simultaneously based on the symmetry of the cost function surface obtained in the executing step;
   executing a maximum likelihood optimization for the Zernike polynomial coefficients or coefficients of the another set of functions according to the combination by searching for a minimum of the cost function.

2. The method according to claim 1, further comprising a fitting process to fit a cost function surface to a quadratic function to improve the maximum likelihood optimization for the Zernike polynomial coefficients or coefficients of the another set of functions according to the combination.

3. The method according to claim 1, wherein the data are obtained by using a wavefront corrective lens, which is arranged before the lenslet array, to reduce aberration of the wavefront to be within the dynamic range of the wavefront sensor.

* * * * *